(12) United States Patent
Kujirai et al.

(10) Patent No.: US 8,259,336 B2
(45) Date of Patent: Sep. 4, 2012

(54) PRINT CONTROL APPARATUS AND METHOD, AND PRINT SYSTEM

(75) Inventors: Yasuhiro Kujirai, Tokyo (JP); Hiroshi Koga, Tokyo (JP); Shigeki Kuroda, Tokyo (JP); Shinichi Yamamura, Tokyo (JP); Kazunori Masaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/216,155

(22) Filed: Aug. 23, 2011

(65) Prior Publication Data

US 2011/0310426 A1 Dec. 22, 2011

Related U.S. Application Data

(60) Continuation of application No. 12/985,243, filed on Jan. 5, 2011, now Pat. No. 8,035,841, which is a continuation of application No. 11/838,964, filed on Aug. 15, 2007, now Pat. No. 7,889,375, which is a division of application No. 09/840,894, filed on Apr. 25, 2001, now Pat. No. 7,286,250.

(30) Foreign Application Priority Data

Apr. 27, 2000 (JP) ................................. 2000-128540
Apr. 27, 2000 (JP) ................................. 2000-128541
Apr. 27, 2000 (JP) ................................. 2000-128543

(51) Int. Cl.
*G06K 15/00* (2006.01)
*G06F 3/12* (2006.01)
*H04N 1/32* (2006.01)

(52) U.S. Cl. ..................... 358/1.15; 358/1.14; 358/1.16; 358/468

(58) Field of Classification Search ................. 358/1.15, 358/1.16, 1.14, 401, 468, 450; 715/741, 715/744

See application file for complete search history.

(56) References Cited

U.S. PATENT DOCUMENTS

| 4,187,498 | A | 2/1980 | Creekmore | 340/5.8 |
| 5,383,129 | A | 1/1995 | Farrell | 364/464.01 |
| 5,579,087 | A | 11/1996 | Salgado | 355/202 |
| 5,787,414 | A | 7/1998 | Miike et al. | 715/243 |

(Continued)

FOREIGN PATENT DOCUMENTS

JP 03-255469 11/1991

(Continued)

OTHER PUBLICATIONS

Kuraki, "Practical Cassiopia Mobile Techniques #4: Connections, Email and Internet Usage—The ABC's of Communication with the Cassiopia", *CYBIZ*, Feb. 1998 Edition (vol. 3, No. 3, Cybiz Inc.), Feb. 1, 1998, pp. 102-105.

(Continued)

*Primary Examiner* — Jerome Grant, II
(74) *Attorney, Agent, or Firm* — Fitzpatrick, Cella, Harper & Scinto

(57) ABSTRACT

In this invention, a combined job obtained by combining a plurality of jobs is authenticated as a single job. According to the arrangement of this invention, when print jobs are to be spooled, these jobs are transferred from a dispatcher to a spooler where the jobs are combined. Upon reception of a print instruction, the print job is read out from a spool file, transferred from a despooler to a graphic engine again, and transferred from the dispatcher to a printer driver. At this time, the printer driver issues an authentication request in printing to a job accounting client. Thus, only one authentication request suffices for one combined job.

27 Claims, 23 Drawing Sheets

U.S. PATENT DOCUMENTS

| | | | |
|---|---|---|---|
| 5,797,067 A | 8/1998 | Mitekura | 399/79 |
| 6,003,069 A | 12/1999 | Cavill | 709/205 |
| 6,064,838 A | 5/2000 | Maruta et al. | 399/79 |
| 6,216,113 B1 | 4/2001 | Aikens et al. | 705/34 |
| 6,552,814 B2 | 4/2003 | Okimoto et al. | 358/1.13 |
| 6,618,566 B2 | 9/2003 | Kujirai et al. | 399/79 |
| 7,286,250 B2 | 10/2007 | Kujirai et al. | 358/1.15 |
| 7,313,699 B2 | 12/2007 | Koga | 713/170 |
| 2006/0272010 A1 | 11/2006 | Kim | 726/3 |
| 2008/0186242 A1 | 8/2008 | Shuster et al. | 343/762 |
| 2008/0273223 A1 | 11/2008 | Tsai et al. | 358/1.15 |

FOREIGN PATENT DOCUMENTS

| | | |
|---|---|---|
| JP | 04-331175 | 11/1992 |
| JP | 06-149890 | 5/1994 |
| JP | 06-350786 | 12/1994 |
| JP | 07-073128 | 3/1995 |
| JP | 07-246758 | 9/1995 |
| JP | 08-016520 | 1/1996 |
| JP | 08-090846 | 4/1996 |
| JP | 08-221364 | 8/1996 |
| JP | 09-185503 | 7/1997 |
| JP | 09-219722 | 8/1997 |
| JP | 09-244828 | 9/1997 |
| JP | 10-021022 | 1/1998 |
| JP | 10-161823 | 6/1998 |
| JP | 10-187369 | 7/1998 |
| JP | 10-187384 | 7/1998 |
| JP | 10-207661 | 8/1998 |
| JP | 11-007520 | 1/1999 |
| JP | 11-015612 | 1/1999 |
| JP | 11-034410 | 2/1999 |
| JP | 11-095955 | 4/1999 |
| JP | 11-096118 | 4/1999 |
| JP | 11-108705 | 4/1999 |
| JP | 11-143668 | 5/1999 |
| JP | 11-167471 | 6/1999 |
| JP | 11-203074 | 7/1999 |
| JP | 11-232049 | 8/1999 |
| JP | 11-301058 | 11/1999 |
| JP | 11-327861 | 11/1999 |
| JP | 11-338825 | 12/1999 |
| JP | 11-353558 | 12/1999 |
| JP | 2000-043384 | 2/2000 |
| JP | 2000-082043 | 3/2000 |
| JP | 2000-098819 | 4/2000 |
| JP | 2000-099294 A | 4/2000 |
| JP | 2001-312377 | 11/2001 |
| JP | 2001-312386 | 11/2001 |
| JP | 2001-312396 | 11/2001 |

OTHER PUBLICATIONS

Yoshimura, "Yesterday was Yesterday, Today is Today (2) Networking Fun with Macintosh and Unix: Towards Construction of a Purpose-Oriented Environment", *Unix Magazine*, Aug. 1994 Edition, (vol. 9, No. 7), ASCII Inc., Jul. 1, 1994, pp. 23-25.

Notomi, "Techniques for Mastering Applications: Netscape Navigator Usage #3", *Mac Fan Internet*, May 1997 Edition, (vol. 2, No. 5), Mainichi Communications Inc., May 1, 1997, pp. 74-75.

Sato, "Mastering the Internet in 30 Minutes Part II—Advanced Browser Usage: Displaying Secure Web Pages", *Nikkei Personal Computer*, No. 359, Nikkei BP Publishing, Apr. 17, 2000 Edition, p. 173.

FIG. 5

END OF PRINTING

| |  |
|---|---|
| PRINTER NAME | |
| API RETURN VALUE ISSUED AT START OF JOB | — 403 |
| JOB INFORMATION (INCLUDING AUTHENTICATION INFORMATION) | — 401 |
| SIZE INFORMATION | |
| VERSION INFORMATION | |
| TOTAL NUMBER OF SHEETS DISCHARGED FOR JOB | — 404 |
| NUMBER OF DETAILED INFORMATION BLOCKS IN JOB | |
| POINTER TO DETAILED INFORMATION (BLOCK 1) | |
| : | 405 |
| POINTER TO DETAILED INFORMATION (BLOCK N) | |
| DOUBLE-/SINGLE-SIDE INFORMATION (BLOCK 1) | |
| PAPER TYPE INFORMATION (BLOCK 1) | |
| PAPER SIZE INFORMATION (BLOCK 1) | |
| COLOR INFORMATION (BLOCK 1) | |
| INFORMATION ABOUT NUMBER OF PAGES PER SHEET (BLOCK 1) | 406 |
| NUMBER OF COPIES (BLOCK 1) | |
| NUMBER OF SHEETS OUTPUT FOR THIS BLOCK (BLOCK 1) | |
| : | |
| DOUBLE-/SINGLE-SIDE INFORMATION (BLOCK N) | |
| PAPER TYPE INFORMATION (BLOCK N) | |
| PAPER SIZE INFORMATION (BLOCK N) | |
| COLOR INFORMATION (BLOCK N) | |
| INFORMATION ABOUT NUMBER OF PAGES PER SHEET (BLOCK N) | |
| NUMBER OF COPIES (BLOCK N) | |
| NUMBER OF SHEETS OUTPUT FOR THIS BLOCK (BLOCK N) | |

F I G. 10
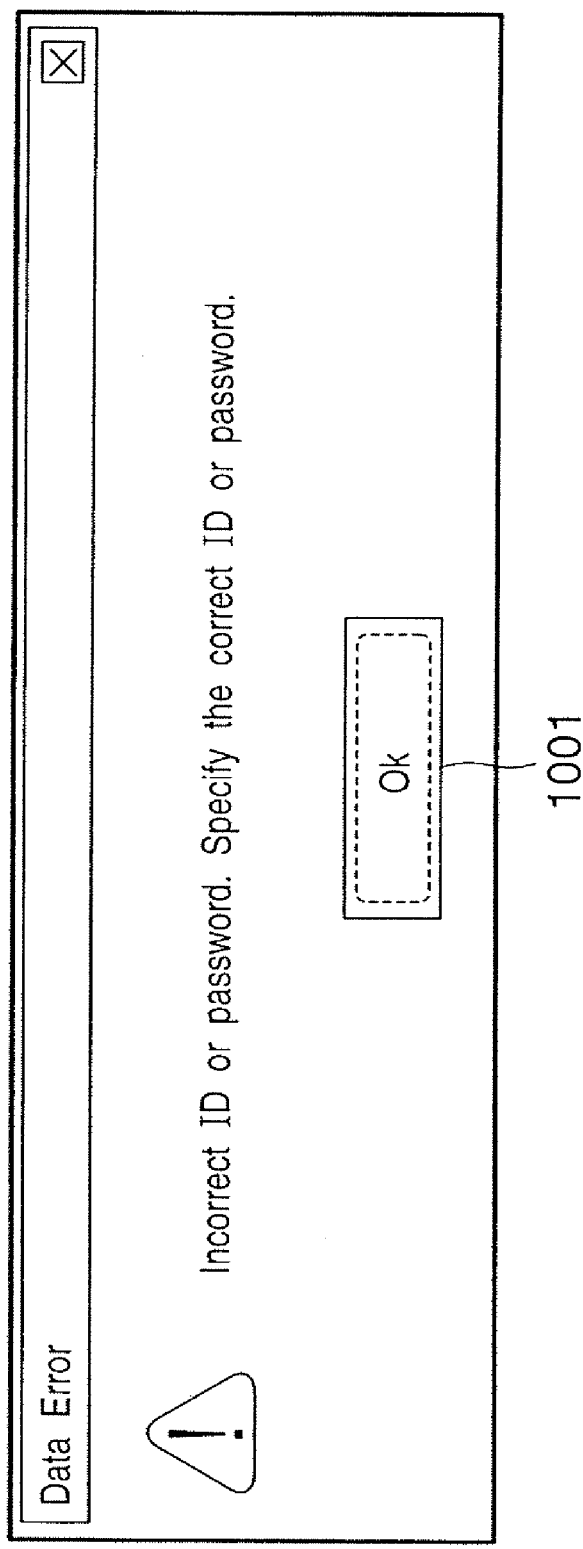

PRINT CONTROL APPARATUS AND METHOD, AND PRINT SYSTEM

This application is a continuation of U.S. patent application Ser. No. 12/985,243, filed Jan. 5, 2011 (allowed), which is a continuation of Ser. No. 11/838,964, filed Aug. 15, 2007, now U.S. Pat. No. 7,889,375, issued on Feb. 15, 2011, which is a divisional of U.S. patent application Ser. No. 09/840,894, filed Apr. 25, 2001, now U.S. Pat. No. 7,286,250, issued on Oct. 23, 2007, all of which are incorporated by reference herein in their entirety, as if fully set forth herein, and which claim the benefit of priority under 35 U.S.C. §119, based on Japanese Patent Application No. 2000-128543, filed Apr. 27, 2000, Japanese Patent Application No. 2000-128541, filed Apr. 27, 2000, and Japanese Patent Application No. 2000-128540, filed Apr. 27, 2000, which are incorporated by reference herein in their entirety, as if fully set forth herein.

FIELD OF THE INVENTION

The present invention relates to a print control method and apparatus and a medium in a system including both a printer and an information processing apparatus such as a personal computer.

BACKGROUND OF THE INVENTION

Recently, a job accounting system for counting the number of sheets used for each user and performing accounting or the like on the basis of the data is being available for a network-connected printer.

The job accounting system manages accounting information such as the number of sheets to be printed for each user. The user can use a printer belonging to the job accounting system only when he/she is authenticated by the system. The user inputs authentication information such as an ID or password to the system before execution of a print job, and is generally authenticated in units of jobs.

Also in a printer used in this accounting system, various additional functions are realized for a printer driver of controlling the printer. A printer driver having, among these functions, a job combination function of temporarily spooling a plurality of jobs and printing them at once is available.

To print data by the printer driver using the job combination function in the job accounting system, print jobs are not processed as a single job in authentication, and the user must perform authentication processing for each of the combined print jobs. This degrades productivity and operability, which is the first problem.

In the system in which authentication is done in units of print jobs, authentication information must be confirmed even at a terminal dedicated to a single user every time a print request is issued to generate a print job. This is cumbersome and degrades operability. To print data in an environment where a plurality of pieces of authentication information are used, e.g., at a terminal shared by a plurality of users, accurate accounting information cannot be acquired unless authentication information is confirmed for each print job. Owing to the usage of the terminal, operability and authentication reliability are difficult to be consistent with each other, which is the second problem.

When authentication information is not confirmed for each print job, authentication processing is performed without confirming authentication information in advance every printing. In this case, authentication information must be confirmed to be correct prior to printing, which is the third problem.

When the job accounting system is implemented by a computer, it is implemented by the OS (Operating System). Some types of OSs can define a plurality of authority levels, but only a single job accounting setting method is provided. For example, a given type of OS cannot provide the manager with a flexible operation method such as a function capable of changing whether to save authentication information, which is the fourth problem.

SUMMARY OF THE INVENTION

The present invention has been made to solve the first problem, and has as its object to improve the operability of authentication processing by providing a print control method and apparatus which enable printing by single authentication processing for combined print jobs in a printer driver having a function of combining a plurality of print jobs into a single print job and printing it.

The present invention has been made to solve the second problem, and has as its object to provide a print control apparatus and method and a print system capable of flexibly changing authentication information confirmation procedures in accordance with the operation environment and causing the user to confirm authentication information in accordance with the operation environment.

The present invention has been made to solve the third problem, and has as its object to provide a print control apparatus and method and a print system capable of determining correctness of authentication information prior to printing.

The present invention has been made to solve the fourth problem, and has as its object to provide a print control apparatus and method and a print system that provide a method of saving a plurality of pieces of authentication information in an OS which can define a plurality of authority levels, thereby providing a flexible operation method to a user having an authority with a high degree of freedom.

To achieve the above objects, an aspect of the present invention has the following arrangement.

A print control apparatus for performing user authentication processing in print processing comprises a job combination unit for combining a plurality of print jobs into a single combined print job, and an authentication request unit for issuing an authentication request to an authentication server for the single print job combined by the job combination unit, wherein if the authentication request succeeds, the combined print job is transmitted.

The print control apparatus preferably further comprises a counting unit for counting a print amount including the number of prints to be printed by the combined print job and transmitting information about the counted print amount to a counting server.

It is preferable that the authentication server and the print control apparatus be connected via a communication network, and that the communication network be connected to a plurality of printers.

The authentication server is preferably provided by a printer.

Another aspect of the present invention has the following arrangement.

A print control apparatus for performing user authentication processing in print processing comprises a holding unit for holding authentication information input from software for generating print data, an authentication request unit for transmitting the authentication information held by the holding unit to an authentication server and requesting authentication, and an output unit for transmitting the authentication information held by the holding unit to the authentication server and if authentication succeeds, outputting print data to a printer.

The print control apparatus preferably further comprises a re-input unit for re-inputting the authentication information held by the holding unit if the authentication request from the authentication request unit fails.

The print control apparatus preferably further comprises a confirmation unit for causing a user to confirm the authentication information held by the holding unit before the authentication information is transmitted from the output unit to the authentication server.

It is preferable that the print control apparatus further comprise a setting unit for setting whether to cause the user to confirm the authentication information via the confirmation unit, and that when the setting unit sets the authentication information so as not to confirm the authentication information via the confirmation unit, the confirmation unit do not operate.

The print control apparatus preferably further comprises a counting unit for counting a print amount including the number of prints by the printer on the basis of print data output from the output unit and transmitting information about the counted print amount to a counting server.

It is preferable that the authentication server and the print control apparatus be connected via a communication network, and that the communication network be connected to a plurality of printers.

The authentication server is preferably provided by the printer.

It is preferable that the print control apparatus further comprise a designation unit for designating whether to hold the authentication information by the holding unit, and that when the designation unit designates not to hold the authentication information, the authentication information held by the holding unit be erased every authentication.

It is preferable that a user be assigned an identifier and an authority level corresponding to the identifier, and that the print control apparatus further comprise a validating unit for validating the designation unit when the authority level assigned to the user is a predetermined authority level.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing an example of information transferred from the printer driver to the job accounting client application;

FIG. 10 is a view showing an example of a message box displayed when authentication information is determined to be incorrect;

DETAILED DESCRIPTION OF THE PREFERRED EMBODIMENTS

First Embodiment

A job accounting system to which the present invention is suitably applied will be explained.

<General Description of Building Components of Job Accounting System>

Figure 1:
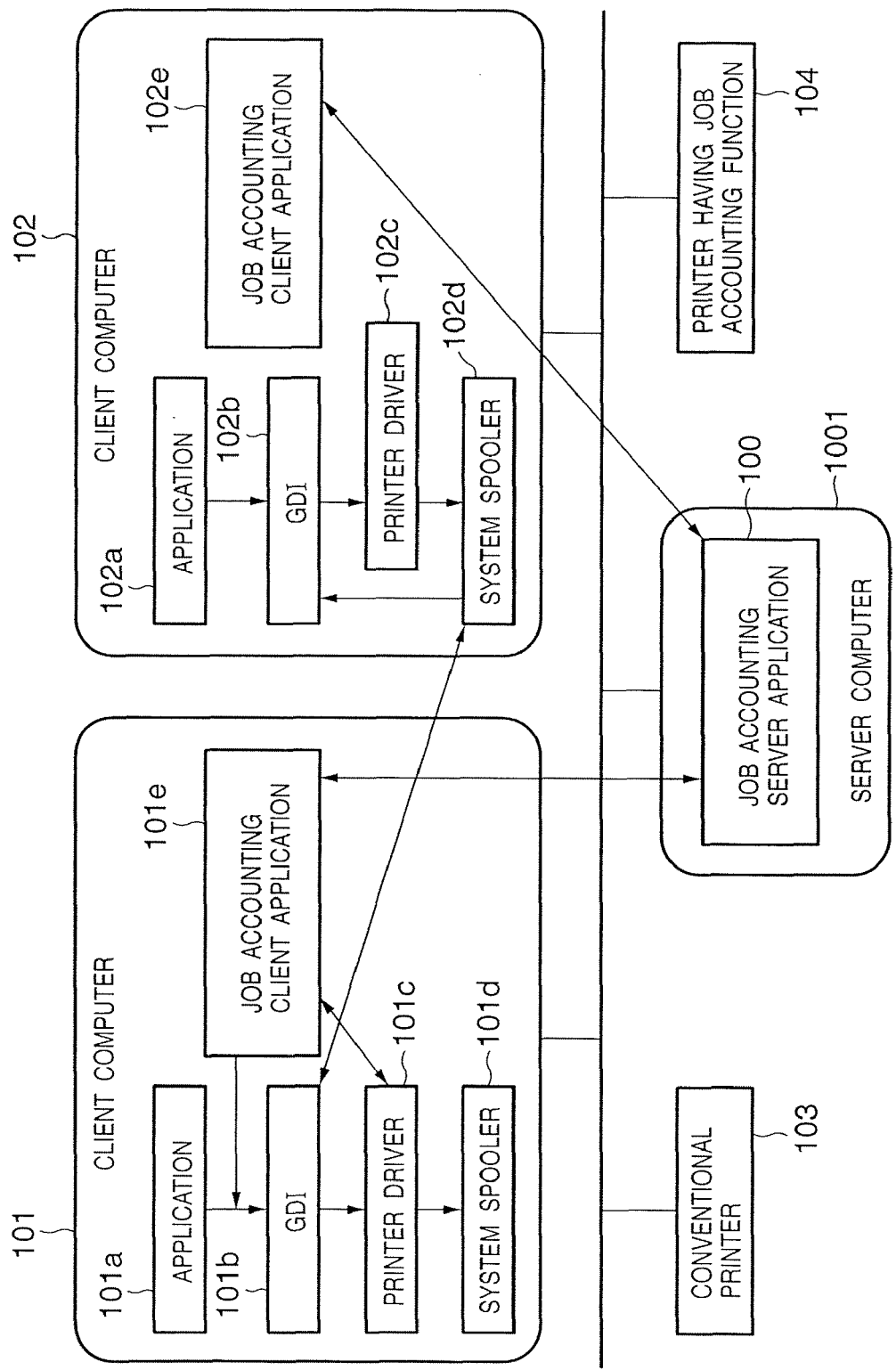
FIG. 1 is a block diagram showing an example of a job accounting system.

FIG. 1 is a block diagram showing an example of the job accounting system. This system includes computers 101 and 102 serving as clients, a computer 1001 serving as a job accounting server, a conventional printer 103, and a printer 104 having a job accounting function. The computers 101 and 102 execute various applications, and outputs by the application programs are printed by the printer 103 or 104.

Prior to a description of the overall system, a job accounting server application, a job accounting client application, and a printer having a job accounting function will be explained as hardware or software building components.

(Printer Having Job Accounting Function)

The printer having the job accounting function has not only the function of a general (conventional) printer, but also a job accounting function of accumulating and managing the number of printed pages, paper size, double-/single-side printing, and color/monochrome printing for each user, and an authentication function of authenticating the user. In user authentication, authentication information sent from the job accounting client application (to be described later) is collated with user-unique information stored in advance, and whether to authenticate the user is responded.

(Conventional Printer)

A conventional printer does not have any job accounting function, and printing is done based on received print data.

(Job Accounting Server Application)

The job accounting server application provides a conventional printer having no job accounting function with the same function as the job accounting function of the printer having the job accounting function. The job accounting server application is executed on a server computer functioning as a job accounting server, and its functions are equivalent to the functions of the printer having the job accounting function except for a printing function.

The functions are roughly classified into two. The first function is a user authentication function, and the second one is a job accounting function. The user authentication function is the same as that of the printer having the job accounting function. However, the job accounting server application does not have any print function, and thus cannot generate job accounting information while printing it. As for the job accounting function, therefore, job accounting information transmitted from the job accounting client application is accumulated and managed.

(Job Accounting Client Application)

The job accounting client application roughly has two functions. The first function is a user authentication function. When a printer driver issues an authentication request, the job accounting client application transmits authentication information received together with the request to the job accounting server application or printer having the job accounting function, receives the authentication result, and sends it back to the printer driver.

The second function is a job accounting information generation function. This function is executed only when a printer in use is a conventional printer having no job accounting function. The job accounting client application acquires print information in the following manner and generates, from this information, job accounting information such as the number of pages to be printed and the size. The job accounting client application transmits the generated job accounting information to the job accounting server application. The second function is enabled only when a computer having a job accounting server application exists on a network.

The authentication function and job accounting function are implemented in a single module in the first embodiment, but may be implemented in separate modules.

(Printer Driver)

Printer drivers can be classified into two types in the first embodiment.

The first type is a printer driver coping with the job accounting function. This printer driver has an authentication function of realizing a user authentication request UI on a computer display prior to printing and issuing an authentication request to the job accounting client application. Further, the printer driver has a function of transferring, to the job accounting client application, original information of job accounting information such as the number of pages to be printed and the size on the basis of print data generated in accordance with a print request received from an application. Printers used are classified into a printer having the job accounting function and a conventional printer having no job accounting function. In the use of a printer having the job accounting function, job accounting information or its original information need not be transferred to the job accounting client application. In this case, the printer need not be equipped with the latter function.

The second type is a printer driver for a conventional printer that does not cope with the job accounting function. This printer driver does not have the two functions.

<Details of Job Accounting System>

The operations of respective units in the arrangement of FIG. 1 will be described. Especially, the operation of a job accounting client application 101e will be explained with reference to the flow chart of FIG. 13.

A job accounting server application 100 exists in the computer 1001 connected to a print network. OSs (Operating Systems) run on the server computer 1001 and the client computers 101 and 102. OSs running on the client computers 101 and 102 will be called OS1 and OS2.

In the client computer 101, an application 101a invokes an API (Application Programming Interface) from a GDI 101b (Graphic Device Interface: system in the OS1 that performs graphic drawing) of the OS.

Figure 13:
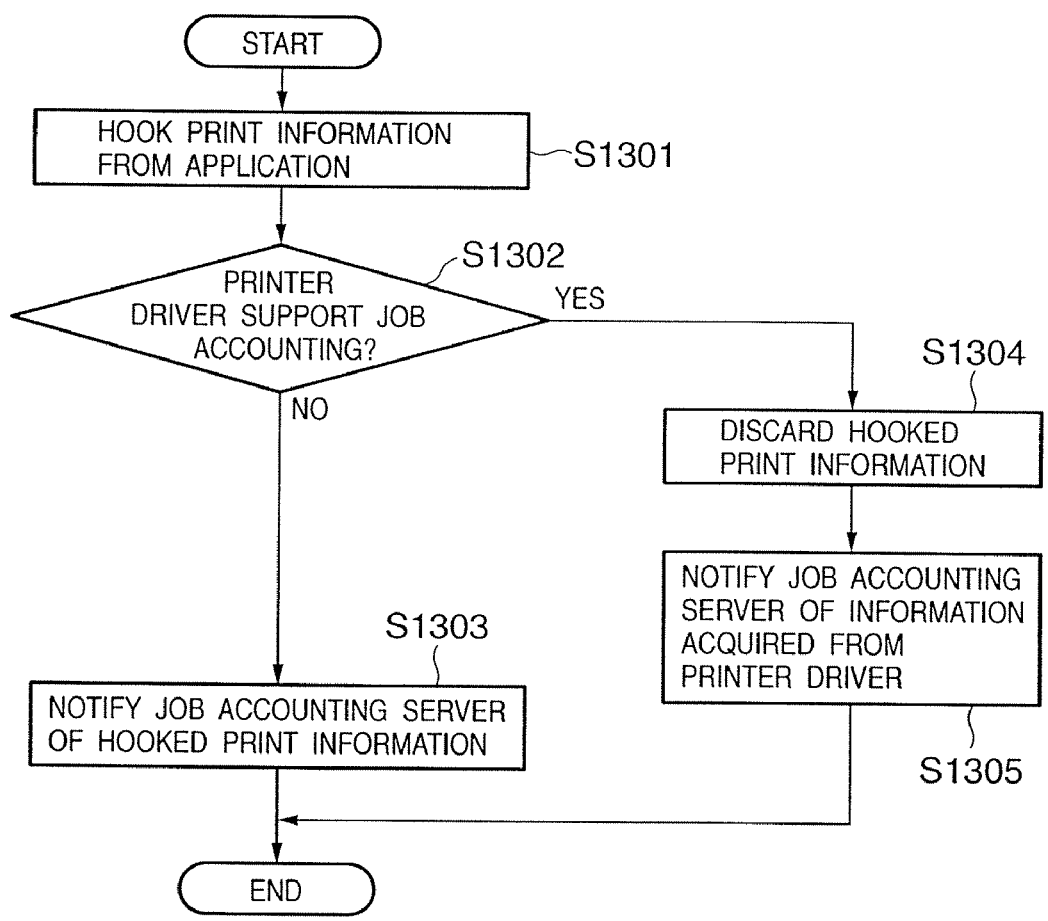
FIG. 13 is a flow chart showing the processing of the job accounting client application.

The job accounting client application 101e monitors (hooks) the API (S1301 in FIG. 13). With this operation, the number of operations of invoking the API which designates page feed or sheet discharge is counted, and the number of discharged sheets and the number of pages for a job issued by the application are acquired. Note that information obtained by hooking the API is used when a printer driver 101c does not have a function of sending print job information. This function is adopted when the printer driver supports the job accounting function, so that the job accounting client application 101e checks whether the printer driver 101c has the job accounting function (step S1302).

If the printer driver 101c has the job accounting function, and the job accounting client application 101e can be notified of print information, the information acquired by hooking is discarded (step S1304), and the job accounting server application 100 is notified of information acquired by the printer driver 101c (step S1305). If the printer driver 101c does not support the job accounting function, the information acquired by hooking the API is transmitted to the job accounting server application 100.

The GDI 101b transfers print data generated based on a print request from the application to a spooler 101d where the print data is accumulated. The spooler 101d transmits the print data to the printer 103 while monitoring the state of the printer 103.

In the client computer 102, when an application 102a invokes an API from a GDI 102b and issues a print job, a printer driver 102c converts the API invoked by the application into print data, and transfers the print data to a system spooler 102d where the print data is accumulated. The system spooler 102d monitors the state of the printer 103, and if the printer 103 is ready, transmits the print data to the printer 103.

A job accounting client application 102e monitors the system spooler 102d on the basis of the API notification from the printer driver 102c, manages the print data and job accounting information in association with each other, and acquires information such as the number of discharged sheets and the number of pages for the print job. An information acquisition method will be described later. Similar to the job accounting client application 101e, the job accounting client application 102*e* notifies the job accounting server application 100 of the information acquired by hooking the API or the job accounting information acquired from the printer driver 102*c*.

As described above, in the first embodiment, the job accounting server application 100 exists in the network-connected computer, and job accounting information acquired by the client computer 102 is accumulated and managed in the job accounting server application 100. The function of counting and managing pieces of print job information is realized by the printer 104 having the job accounting function when print data is transmitted to the printer 104 having the job accounting function. In user authentication, authentication itself is done by the printer 104, but a UI (User Interface) at that time is realized by the printer driver of the printer 104 having the job accounting function.

More specifically, when the user performs printing by using the printer 104, the application transfers data to the GDI, and then the printer driver of the printer 104 generates print data based on the data, similar to a conventional printer. The print data is temporarily accumulated in the system spooler and transmitted to the printer 104. The printer 104 executes printing on the basis of the received data, and generates, accumulates, and manages job accounting information for each user in accordance with the number of pages, the paper size, the type of printing such as double-side printing or color printing.

The system shown in FIG. 1 employs both the printer 104 having the job accounting function and the conventional printer 103 having no job accounting function. In this system, even when the client computer prints data by using the printer 104 having the job accounting function, the job accounting client application 102*e* hooks an API invocation from the application, or the printer driver provides data, thus acquiring job accounting information such as the number of discharged sheets or the number of pages for the print job. The job accounting information is transmitted to the job accounting server application which can centralize the job accounting information. In this case, the printer 104 may manage the job accounting information. In other words, a plurality of job accounting systems may exist on a network.

<Computer Arrangement>

The hardware arrangements of the client computers 101 and 102 and the server computer 1001 in FIG. 1 will be briefly described with reference to FIG. 3.

Figure 3:
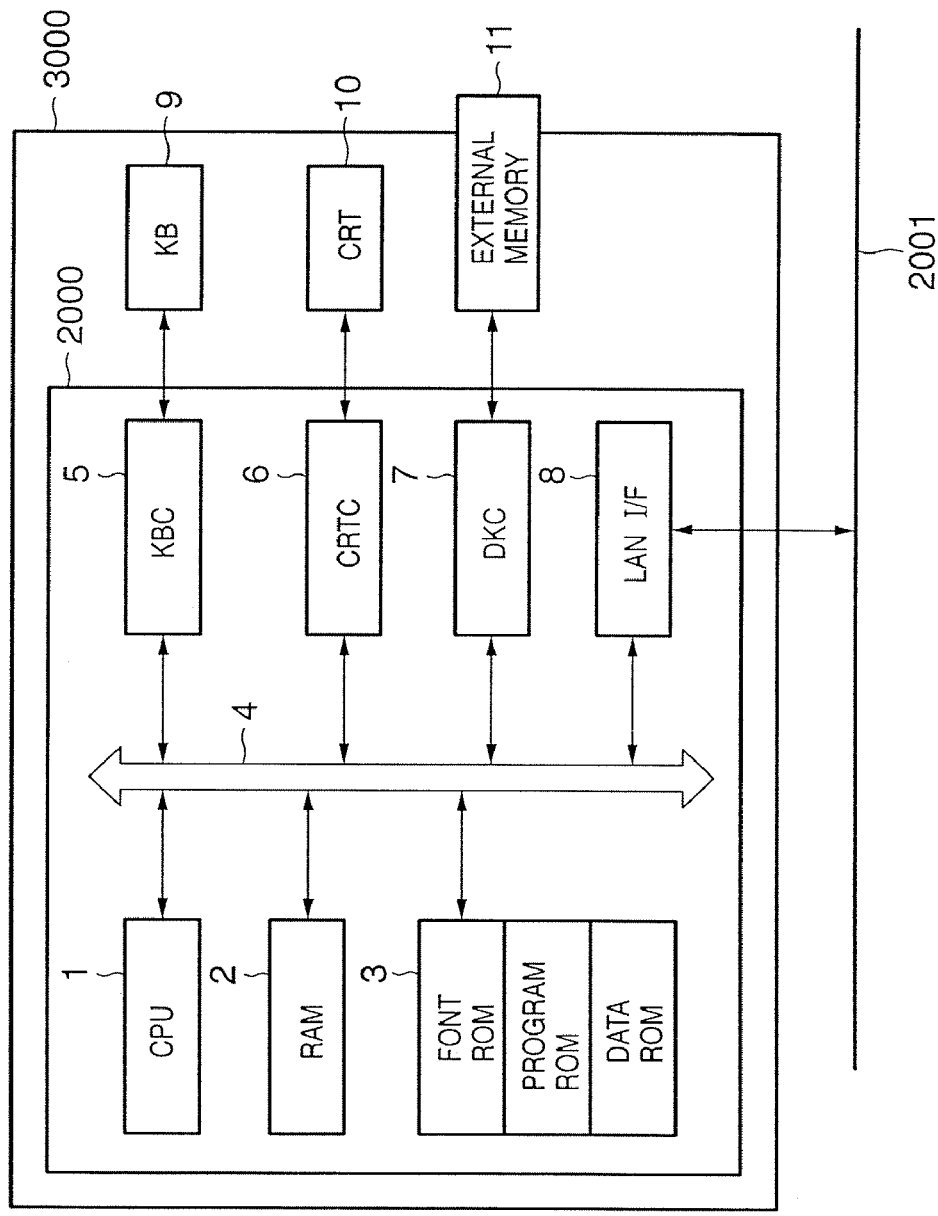
FIG. 3 is a block diagram showing the arrangement of a computer.

In FIG. 3, a computer 3000 comprises a CPU 1 for processing a document containing graphics, images, characters, tables (including a spreadsheet), and the like on the basis of a document processing program or the like stored in the program ROM of a ROM 3. The CPU 1 integrally controls devices connected to a system bus 4. Also, the CPU 1 implements the above-described functions by executing an OS including an application and GDI, and programs such as a printer driver program, system spooler and job accounting client application including the procedures of flow charts (to be described later).

A RAM 2 functions as, e.g., the main memory and work area of the CPU 1. A keyboard controller (KBC) 5 controls a key input from a keyboard 9 or a pointing device (not shown). A CRT controller (CRTC) 6 controls display of a CRT display 10. A disk controller (DKC) 7 controls access to an external memory 11 such as a hard disk (HD) or floppy disk (FD) for storing a boot program, various applications, font data, user files, edit files, and the like. A LAN interface (LAN I/F) 8 is connected to a local area network and executes communication control processing with devices on the network, such as the printer 103, printer 104, and another computer. The CPU 1 executes, e.g., rasterizing processing of an outline font to a display information RAM set on the RAM 2, and enables WYSIWYG (What You See Is What You Get: function of making display contents coincide with print contents) on the CRT 10. Further, the CPU 1 opens various registered windows on the basis of commands designated with a mouse cursor (not shown) on the CRT display 10, and executes various data processes.

In FIG. 1, all the printers are network printers, and the computer is connected to the printers via the LAN interface 8. The present invention can also be applied to an arrangement in which the computer has an interface such as a parallel interface or USB and is connected to a local printer.

<Flow of Job Accounting Processing>

Figure 2:
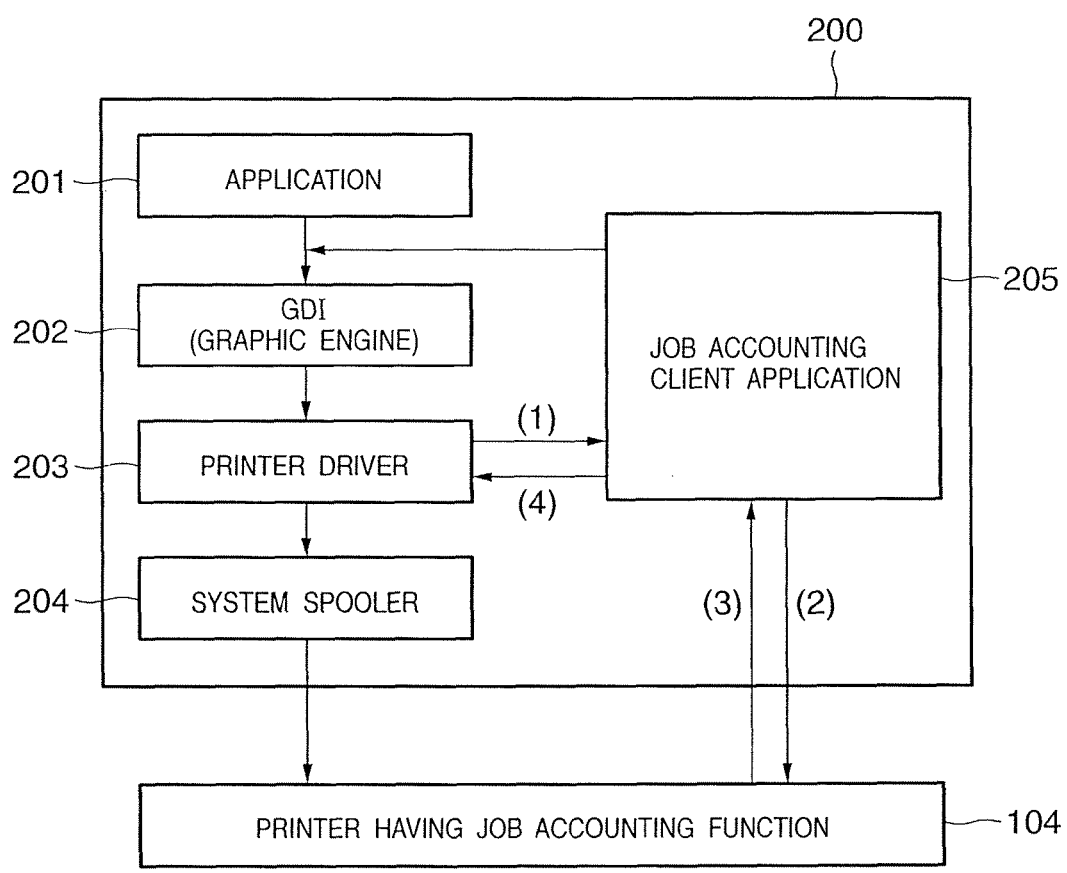
FIG. 2 is a block diagram showing the arrangement of the typical print system of a host computer connected to a printer.

FIG. 2 is a block diagram for explaining the flow of print data transmission from a host computer in FIG. 1 to the printer 104 having the job accounting function. In FIG. 2, a computer 200 corresponds to the client computer 101 or 102, and is connected to the printer 104 not directly but via a network. Assume that the job accounting server application 100 does not exist. The printer driver copes with the job accounting function. In this example, Windows available from Microsoft is used as an OS, so that GDI (Graphic Device Interface) is used as a graphic engine. When another OS is used, a graphic engine prepared for the OS is used.

An application 201, GDI (graphic engine) 202, printer driver 203, and system spooler 204 are program modules which exist as files saved in, e.g., the external memory 11 on the host computer, and when being to be executed, are loaded to the internal memory 2 of the host computer by an OS or a module using these modules.

The GDI (graphic engine) 202 loads the printer driver 203 prepared for each printing apparatus to the internal memory of the computer, and sets an output from the application 201 to the printer driver 203. The GDI (graphic engine) 202 converts print data received from the application 201 into a printer driver readable format, and outputs the converted data to the printer driver 203.

The printer driver 203 issues an authentication request to a job accounting client application 205 at the start of printing. The job accounting client application 205 inquires authentication of the printer 104 having the job accounting function, acquires the result, and notifies the printer driver 203 of the result. If authentication succeeds, the printer driver 203 converts the drawing data received from the GDI (graphic engine) 202 into a printer recognizable control command, e.g., PDL (Page Description Language). The converted printer control command is output as print data by the OS via the system spooler 204. When the print data is transmitted to the printer 104 having the job accounting function, authentication information (to be described later) is added and transmitted in the print data. As will be described later, the authentication request destination may be the job accounting server application.

Figure 4:
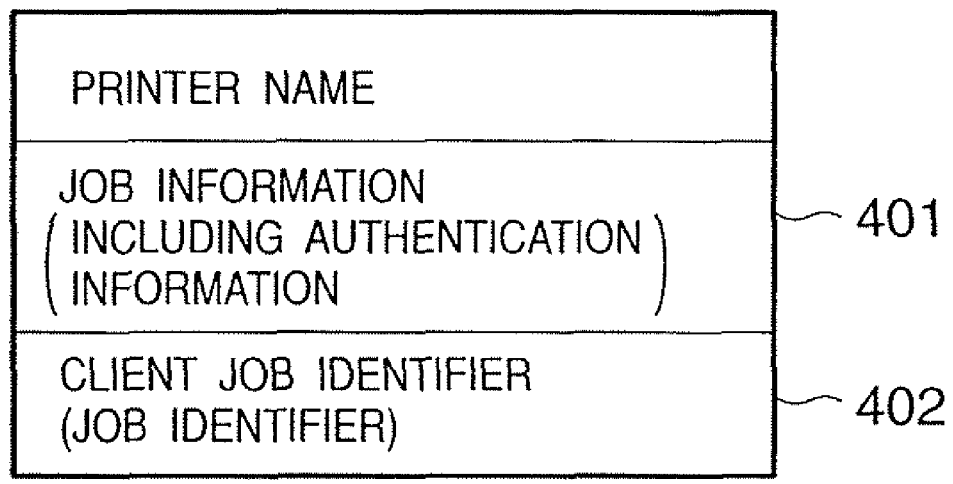
FIG. 4 is a view showing an example of information transferred from a printer driver to a job accounting client application.

FIGS. 4 and 5 are views each showing an example of information transferred from the printer driver 203 to the job accounting client application 205. Information in FIG. 4 is transferred for an authentication request at the start of printing. Job accounting information in FIG. 5 is transferred from the printer driver 203 to the job accounting client application 205 at the end of printing. Upon reception of this notification as a trigger, the job accounting client application 205 (101*e*, 102*e*) periodically monitors the system spooler 204 (101*d*, 102*d*), and manages print data and job accounting information in association with each other, as described above.

In FIG. 4, job information 401 includes information for identifying whether to transmit the job to a printer having the job accounting function or to a printer having no job accounting function, and authentication information such as a user ID or password (to be described later). This also applies to FIG. 5.

A job identifier 402 includes an identifier for association with a print job when the job accounting client application 205 spools the print job in the spooler.

In FIG. 5, an API return value 403 includes an argument received from the job accounting client application 205 when the printer driver notifies the job accounting client application 205 of information in FIG. 4 by using an API at the start of printing.

A total sheet count 404 includes the total number of discharged sheets for the job. Job accounting representing accounting or the like can be realized based on this information.

Block information 405 includes information representing a block divided for sheets having common items when any of items of detailed information 406 changes within one print job by designating the paper size, paper type, or N-up printing (function of printing N pages for each sheet). If these items do not change within one job, one job is set as one block.

The detailed information 406 includes, for each block, pieces of detailed information such as double-/single-side printing, paper type, paper size, color information, the number of pages per sheet, the number of copies, and the total number of sheets per block.

The pieces of information can provide a more detailed job accounting function.

As described above, pieces of job accounting information shown in FIGS. 4 and 5 are transferred from the printer driver to the job accounting client application 205, but are not used in the printer 104 having the job accounting function.

<User Interface of Job Accounting>

A processing flow in the job accounting system by the printer driver 203 will be explained with reference to FIG. 6 and subsequent drawings. In this case, the printer driver 203 copes with the job accounting function, i.e., is for the printer 104 having the job accounting function. However, the printer itself may be the conventional printer 103 as far as the printer driver copes with the job accounting function.

Figure 6:
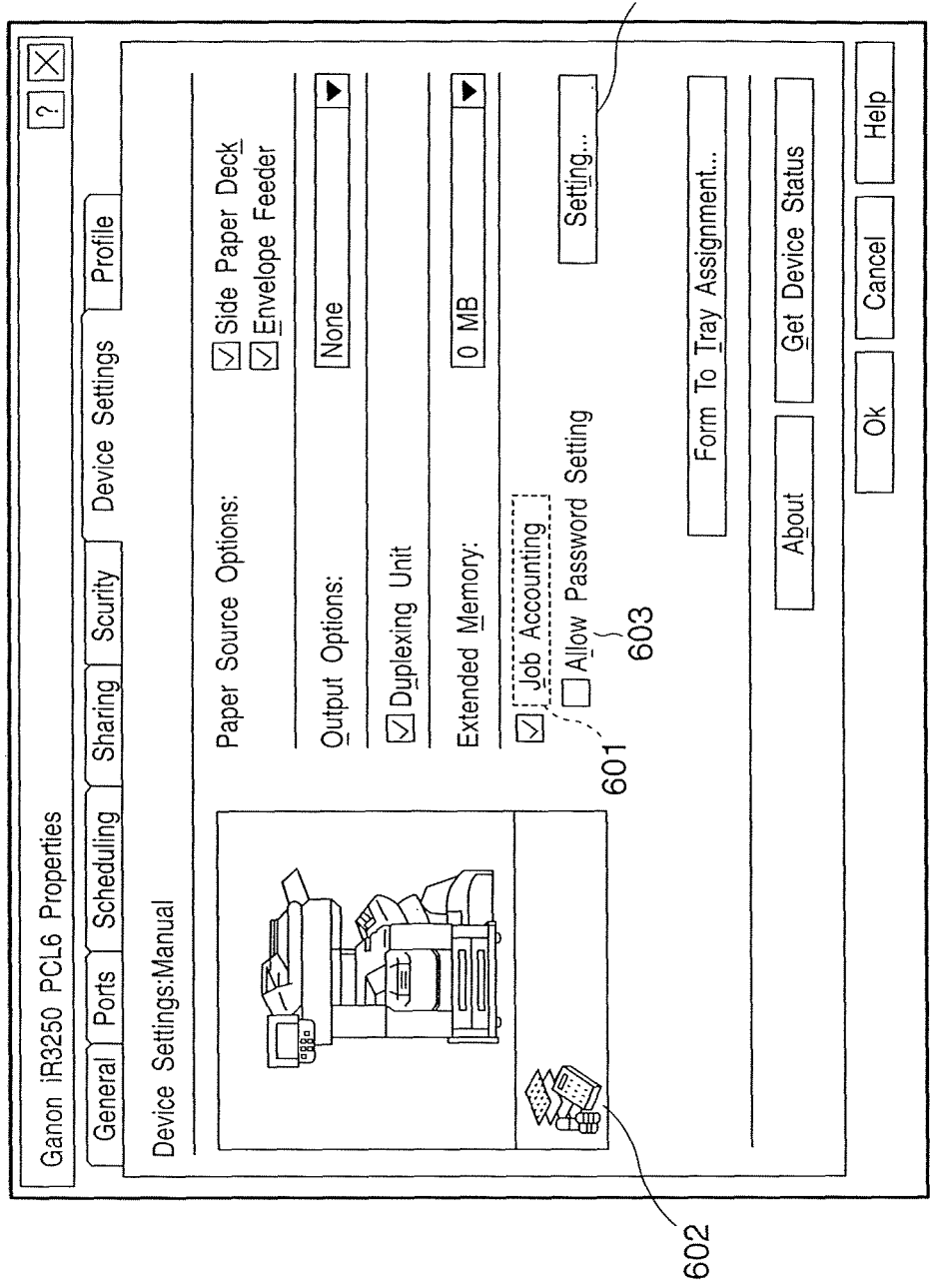
FIG. 6 is a view showing an example of the UI window of print settings by the printer driver.

FIG. 6 shows the window of a GUI (Graphic User Interface) for setting the function of the printer driver 203 in the job accounting system. This will also be simply referred to as printer settings.

If a check box 601 in FIG. 6 is checked, the printer driver 203 operates as part of the job accounting system. If the check box 601 is not checked, the printer driver 203 transmits only print data regardless of the job accounting system.

A left icon 602 is displayed in synchronism with the check box 601. This icon is displayed for all the sheets (various windows displayed as GUIs) of the printer driver, and designed to allow the user to grasp the job accounting setting status at a glance.

A check box 603 is displayed when a user who has a manager authority permitted to set the computer environment and the like sets the printer in an OS which permits each log-in user to have a different authority. Depending on the check ON/OFF state of this check box, whether password information necessary for job accounting can be held is determined for a user who uses this printer driver.

Figure 7:
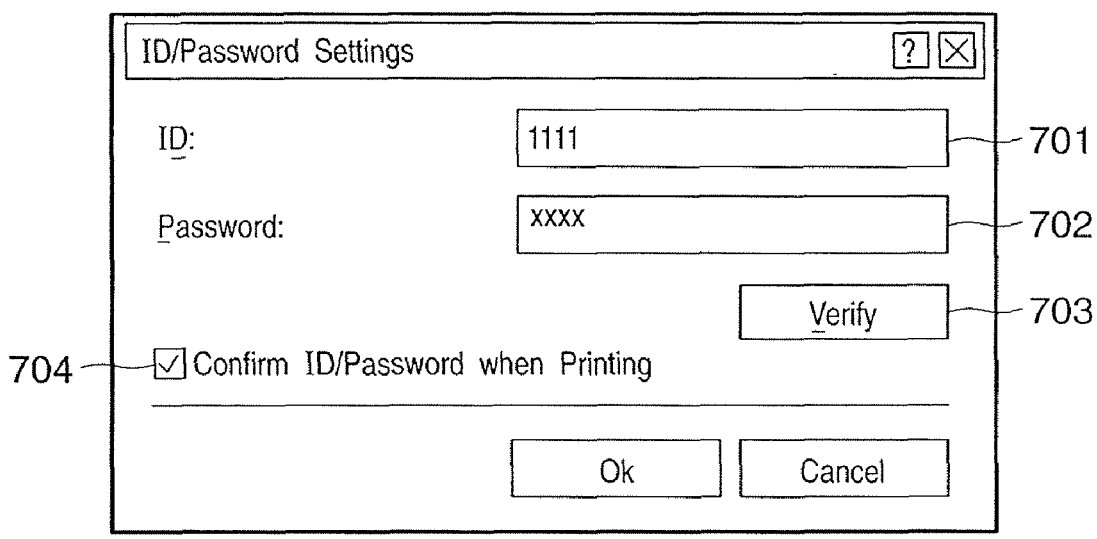
FIG. 7 is a view showing an example of a dialog displayed upon clicking a button 604 when a check box 603 is checked.

More specifically, dialogs displayed upon clicking an authentication information input button 604 are different between the check ON and OFF states of the check box 603. If the check box 603 is checked, the dialog in FIG. 7 is displayed. In this case, the user can input an ID 701 for specifying a department or user as authentication information, and a password 702 for the ID 701.

Figure 8:
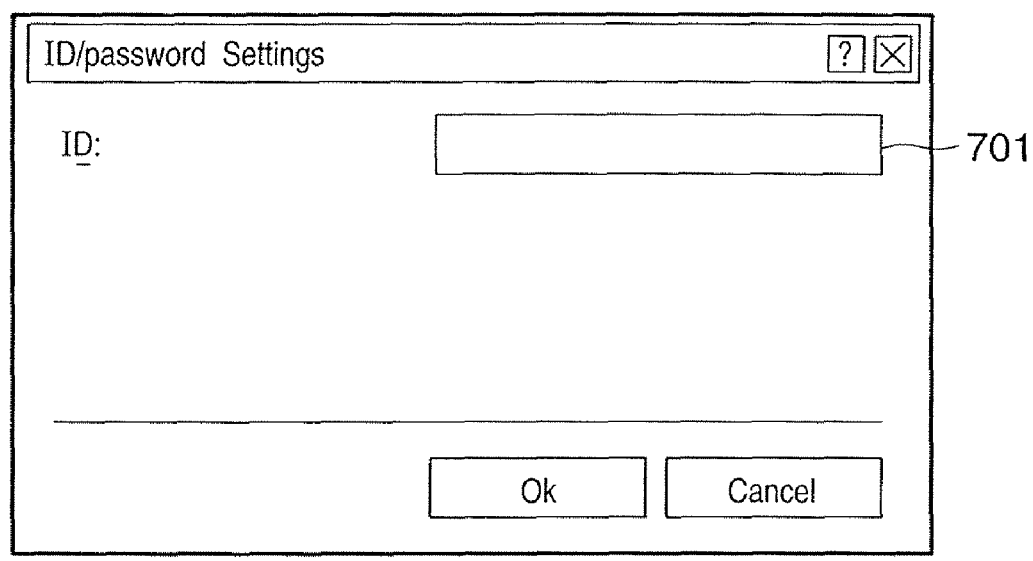
FIG. 8 is a view showing an example of a dialog displayed upon clicking the button 604 when the check box 603 is not checked.

If the check box 603 is not checked, the dialog in FIG. 8 is displayed. That is, the user can input only the ID 701 for specifying a department or user as authentication information.

In this manner, the OS capable of setting a different authority for each user can provide security management variations by the manager.

A button 703 on the authentication information input window in FIG. 7 is used to inquire whether the input ID 701 and password 702 are correct as pieces of job accounting information. The user can click the button 703 when the ID 701 and password 702 are input. If the user clicks the button 703, the printer driver 203 requests authentication information collation of the job accounting client application 205. The job accounting client application 205 transmits the authentication information to the job accounting server application 100 or the printer 104 having the job accounting function, and requests authentication. Authentication is performed by the job accounting server application 100 and/or the printer 104 having the accounting function in accordance with the following three cases.

(Case 1) When the job accounting server application 100 exists in the system, authentication information is transmitted to the job accounting server application 100 to request authentication.

(Case 2) When the printer driver 203 is a printer driver for the printer 104 having the job accounting function, authentication information is transmitted to the printer 104 to request authentication.

(Case 3) When the printer driver 203 is a printer driver for the printer 104 having the job accounting function and the job accounting server application 100 exists in the system, i.e., when two job accounting systems exist in one print system, authentication information is transmitted to the printer 104 to request authentication, and at the same time authentication information is transmitted to the job accounting server application 100 to request authentication.

Alternatively, authentication information input in accordance with a setting (to be described later) may be saved (cached), and the saved authentication information may be transmitted to request authentication. Saving authentication information can shorten the authentication information inquiry time.

Figure 9:
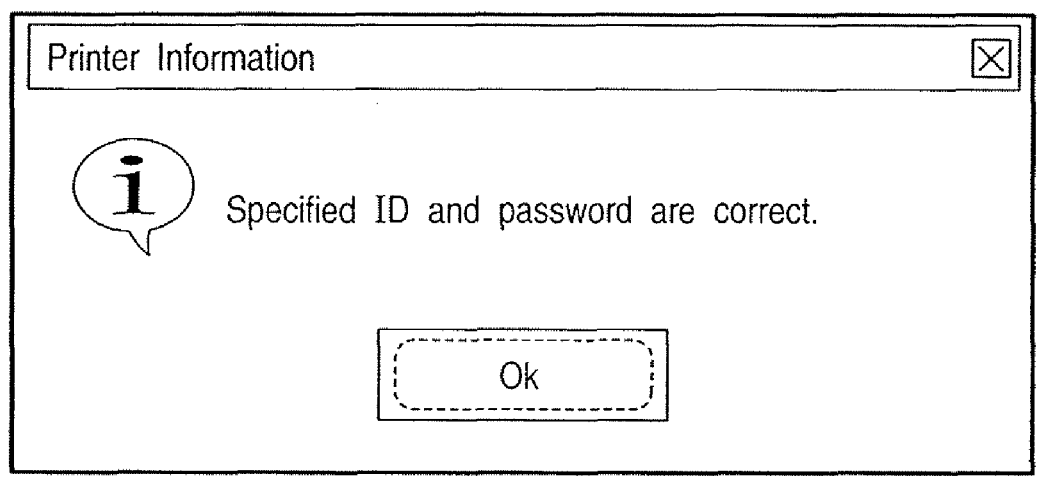
FIG. 9 is a view showing an example of a message box displayed when authentication information is determined to be correct.

If the authentication information is determined to be correct by the inquiry, the message shown in FIG. 9 is displayed. If the authentication information is determined to be incorrect, the message shown in FIG. 10 is displayed.

Figure 11:
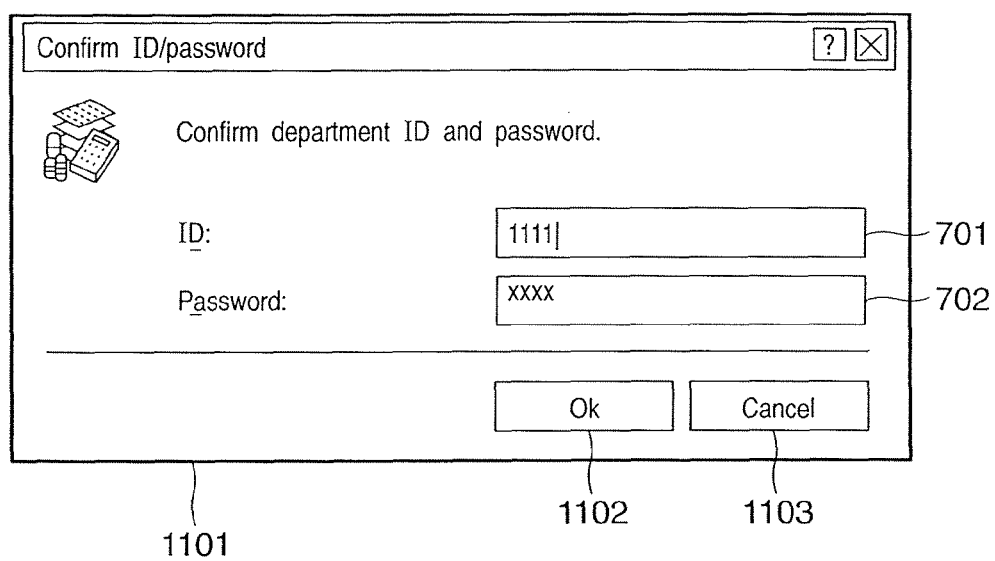
FIG. 11 is a view showing an example of an authentication information confirmation dialog.

A check box 704 is a button for enabling selecting whether to confirm authentication information in printing. When the check box 704 is checked, a dialog 1101 shown in FIG. 11 is displayed immediately before the application issues a print instruction, printing by the printer driver 203 starts, and print data is transmitted. When the check box 704 is not checked, printing is done by using the saved authentication information without displaying the dialog 1101.

Figure 12:
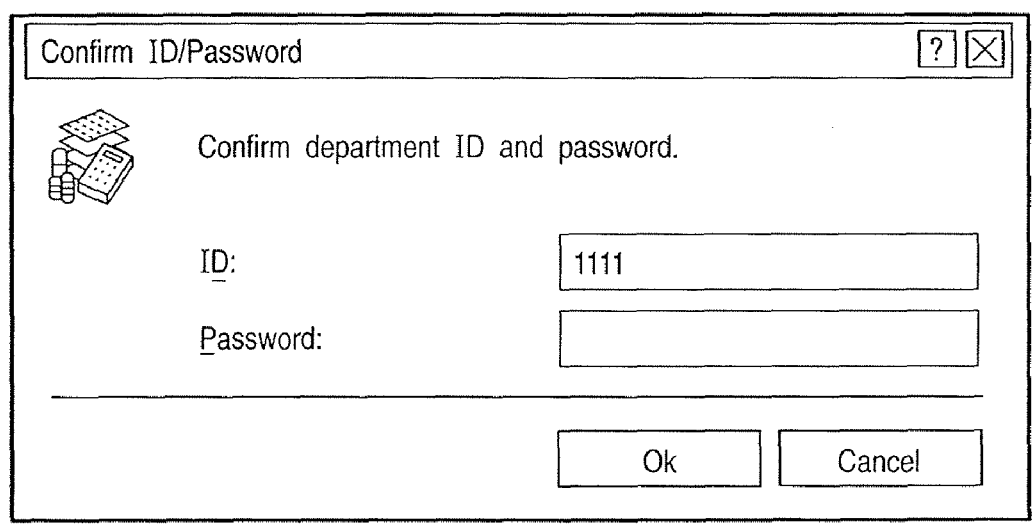
FIG. 12 is a view showing another example of the authentication information confirmation dialog.

Even if the check box 704 is not checked and no authentication information is saved, the dialog 1101 is displayed without displaying the password 702, as shown in FIG. 12, in order to request input of authentication information.

In this way, input authentication information can be held by designating the check box 603, which can eliminate cumbersome input and can shorten the authentication time.

There can be provided a method capable of confirming in advance whether authentication information to be saved is correct by clicking the button 703 and saving correct authentication information for the user.

As a supplemental explanation, when it is set in the check box 603 not to hold password information necessary for job accounting, the password 702 is not held, the check box 704 need not be displayed, and the dialog 1101 is always displayed.

In the first embodiment, authentication information to which saving/non-saving can be designated is limited to the password, and the ID is unconditionally saved. However, whether to save both the password and ID may be designated.

By checking the check box 704 in FIG. 7, the dialog 1101 is displayed for each print job, the user can edit authentication information, and printing using a different ID for each printing can be realized. For example, when the printer driver 203 is used in an environment where printing is done using a plurality of IDs, authentication can be reliably performed for each ID by causing the user to confirm authentication information at the start of a print job and to input authentication information again. When the printer driver 203 is used in an environment where only single authentication information is used, the operation steps can be decreased by eliminating confirmation of authentication information at the start of printing.

The check box 704 enables setting whether to confirm authentication information in printing, which decreases the operation steps in job accounting. Authentication information can be easily changed for each print job, which improves convenience.

When the dialog 1101 is displayed at the start of printing, the user clicks an OK button 1102 to transmit authentication information immediately before transmission of print data. If the authentication information is correct, printing is determined to be enabled, and the print data is transmitted. If the authentication is incorrect, the message in FIG. 10 is displayed, and the user clicks an OK button 1001 to display the dialog 1101. The user inputs authentication information again and clicks the OK button 1102 to transmit the authentication information.

In transmitting saved authentication information, the dialog 1101 is not displayed. If the authentication information is incorrect, the message in FIG. 10 is displayed, and the user clicks an OK button 1101 to display the dialog 1101. The user inputs authentication information again and clicks the OK button 1102 to transmit the authentication information. The user can stop printing by clicking a cancel button 1103. In this case, the printer driver application is notified of the printing failure from the printer driver 203, and does not transmit subsequent print data.

<Printer Setting Processing Procedures>

Figure 17:
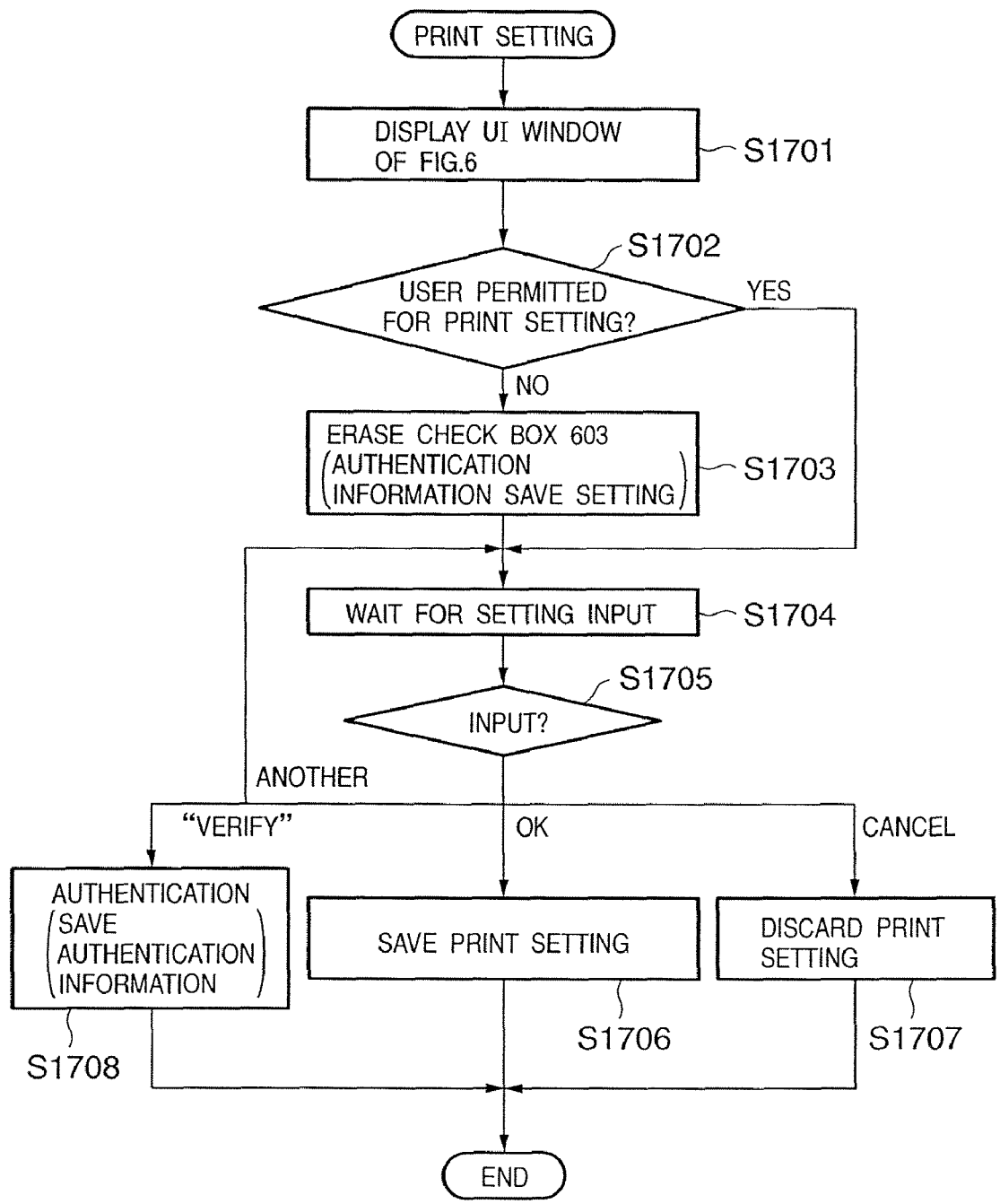
FIG. 17 is a flow chart showing print setting procedures by the printer driver.

FIG. 17 is a flow chart showing processing procedures of displaying the UI window of FIG. 6 and performing settings. This window is displayed by a predetermined printer setting operation. In this case, the processing procedures are executed by the printer driver.

In step S1701, the printer driver displays the UI window of FIG. 6 on a display monitor, e.g., the CRT 10 in FIG. 3. In step S1702, the printer driver determines whether the operating user is a manager user permitted to set the print environment. If NO in step S1702, the check box 603 (setting for saving authentication information) is erased or grayed out in step S1703 so as to prevent input of any information to this check box. If YES in step S1702, the check box 603 is kept displayed.

After the UI window is displayed, the printer driver waits for a user input in step S1704. Upon reception of an input, the printer driver checks the contents in step S1705. If the input is "OK", the printer driver saves print settings input in step S1706, and ends the processing. In this case, save of authentication information is set. If, therefore, authentication information has been input, it is also saved. If the input is "cancel", the printer driver discards the input print settings and ends the processing.

Assume that the clicked button is the "verify" button 703 on the window of FIG. 7 which is opened upon clicking the setting button 604 of the printer setting window. Similar to step S1408 in FIG. 14 (to be described later), the printer driver transfers the input authentication information to the job accounting client application to request authentication. If receiving the authentication result from the job accounting client application, the printer driver checks the result. If authentication succeeds, the window of FIG. 9 is displayed; otherwise, the window of FIG. 10 is displayed. The printer driver notifies the user whether the authentication information is correctly set.

For another input, the printer driver updates the display window in accordance with the input and waits for an input in step S1704.

In this way, only the manager can change the setting for saving authentication information, and can confirm the authentication information prior to printing.

<Job Accounting Processing Procedures by Printer Driver>

Figure 14:
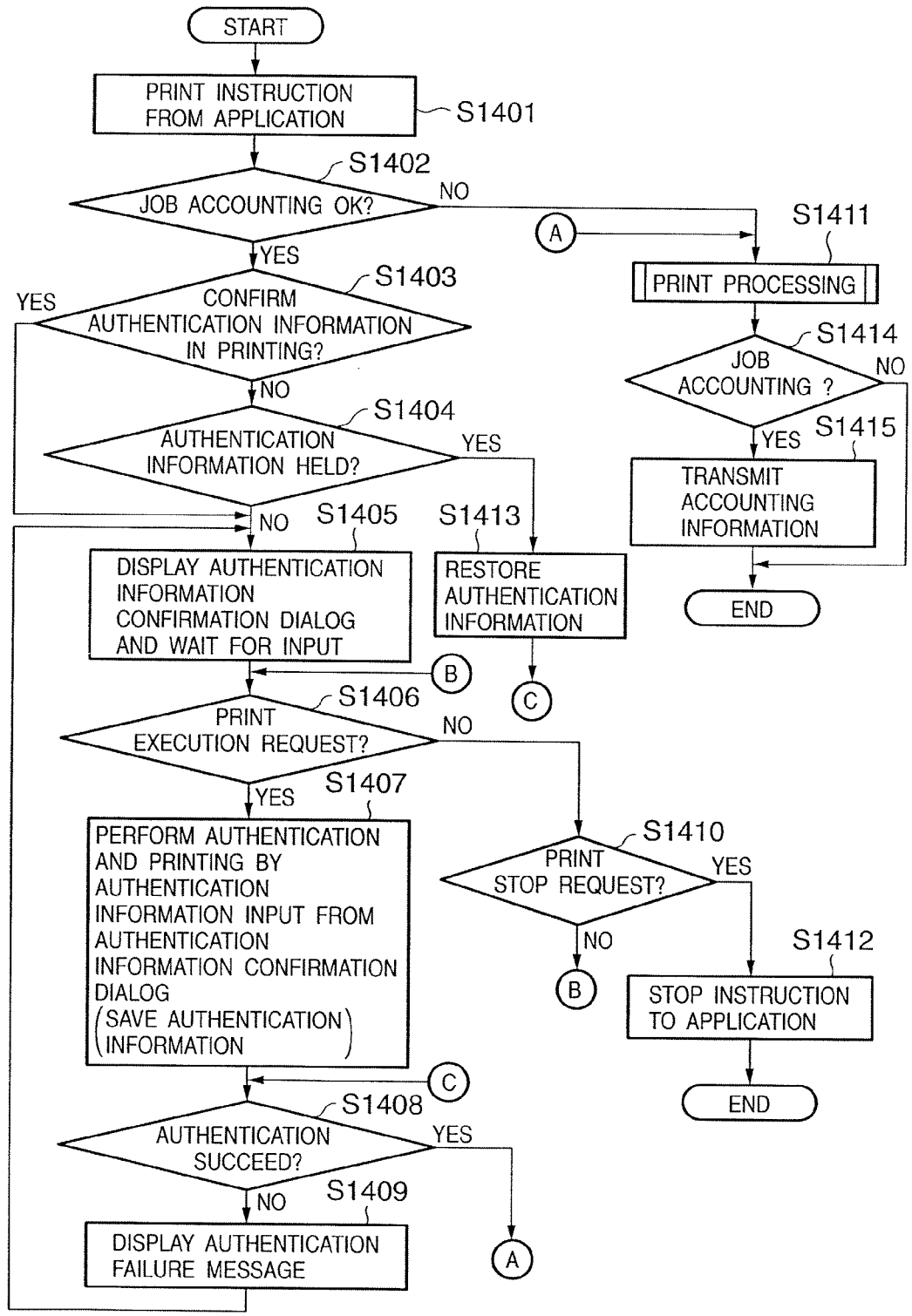
FIG. 14 is a flow chart showing print processing procedures by a client terminal in the first embodiment.

FIG. 14 is a flow chart showing the flow of job accounting processing by the printer driver 203.

In step S1401, the printer driver 203 receives a print instruction from the application 201.

In step S1402, the printer driver 203 determines whether job accounting (check button 601 in FIG. 7) is ON. If YES in step S1402, the printer driver 203 advances to step S1403; if NO, to step S1411.

In step S1403, the printer driver 203 determines based on the check button 704 whether to display the authentication information confirmation dialog of FIG. 11 in printing. If YES in step S1403, the printer driver 203 shifts to step S1405; if NO, to step S1404.

In step S1404, the printer driver 203 determines whether authentication information has been held. If YES in step S1404, the printer driver 203 shifts to step S1413; if NO, to step S1405. For example, in step S1404, the printer driver 203 checks the check button 603 in FIG. 5, and if the check button 603 is ON, determines that authentication information has been held. Alternatively, the printer driver 203 may check the authentication information storage area, and if data other than specific data such as null data is stored, may determine that authentication information has been held.

In step S1405, confirmation of authentication information at the start of printing has been set, or no authentication information is saved. Thus, the printer driver 203 displays the authentication information confirmation dialog 1101 and waits for a user input.

If the user event input is a print execution request (OK button 1102 is clicked) in step S1406, the printer driver 203 advances to step S1407; if NO, to step S1410.

In step S1407, the printer driver 203 executes user authentication on the basis of the input authentication information and starts printing. At this time, when save of authentication information has been set, the printer driver 203 saves the information in a predetermined area of a nonvolatile medium.

In step S1408, the printer driver 203 executes authentication processing. More specifically, the printer driver 203 notifies the job accounting client application 205 of the information shown in FIG. 4. The job accounting client application 205 transmits the acquired information to the job accounting server application 100 or the printer 104 having the job accounting function, and obtains the authentication result.

The printer driver receives the authentication result from the job accounting client application. If authentication succeeds, the printer driver advances to step S1411; if NO in step S1408, to step S1409.

In step S1409, the printer driver displays an authentication failure message, waits for a user input, and returns to step S1405 when the OK button 1001 is clicked.

In step S1410, the printer driver 203 determines whether a user event input is a print stop request (cancel button 1103 is clicked). If YES in step S1410, the printer driver 203 shifts to step S1412; if NO, waits for the next event.

In step S1412, the printer driver 203 notifies the application of the stop of printing.

In step S1411, data transmission to the system spooler starts. After the end of transmission, the printer driver 203 determines in step S1414 whether job accounting is ON. If YES in step S1414, the printer driver 203 notifies the job accounting client application 205 of the job accounting information shown in FIG. 5 at the end of printing in step S1415. The job accounting server application 100 receives the job accounting information from the job accounting client application 205 and performs job accounting based on the received information. Note that when no job accounting server application exists in the network system, this information need not be transmitted.

The printer 104 having the job accounting function counts a numeric value, such as the number of prints for each paper size, serving as the origin of job accounting information in the printer along with print processing.

If YES in step S1404, the printer driver 203 reads out saved authentication information from the cache area to the authentication information area of the RAM in step S1413, and advances to step S1408 to execute authentication processing by using the authentication information.

Figure 15:
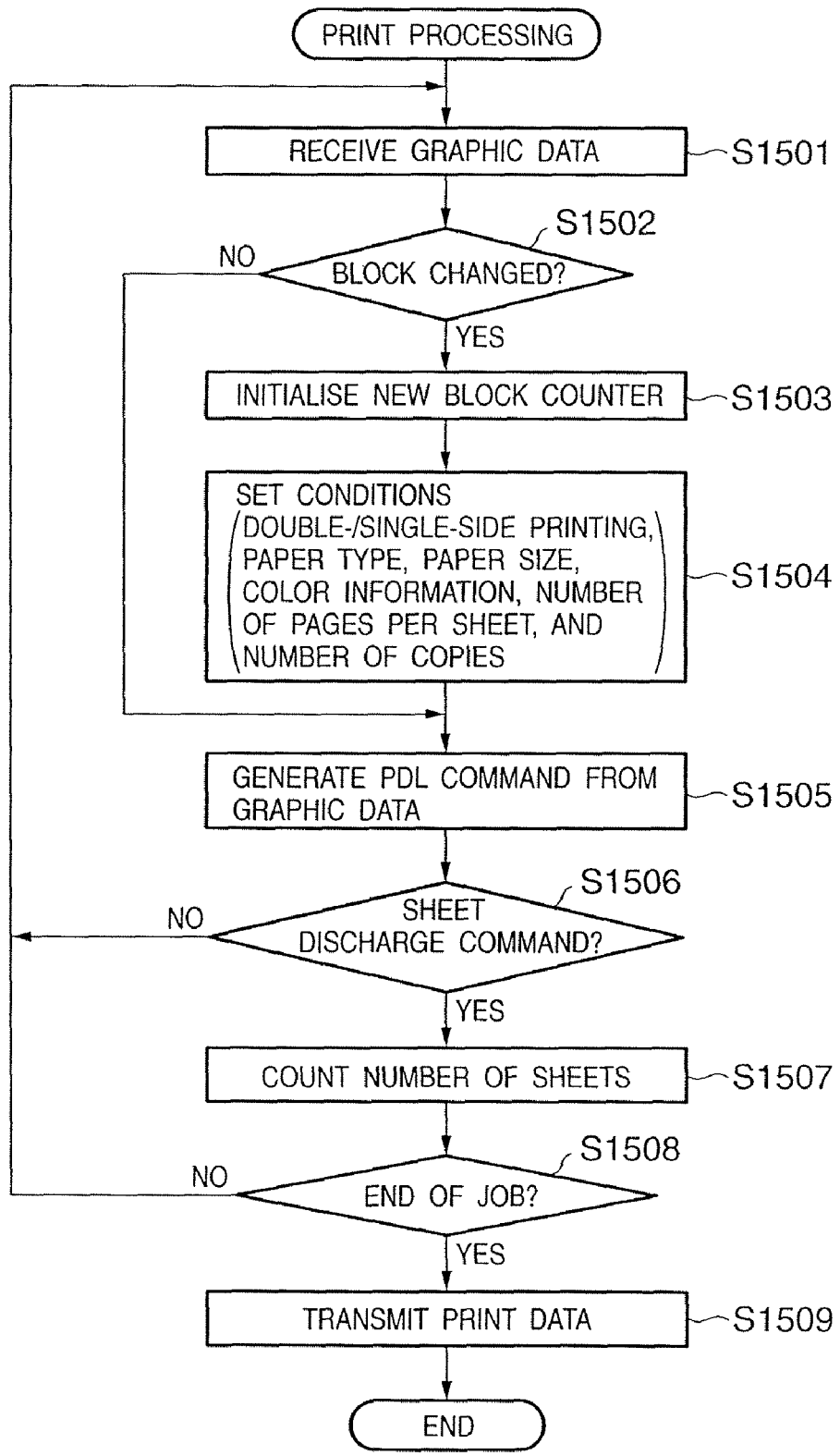
FIG. 15 is a flow chart showing print processing procedures by the client terminal in the first embodiment.

FIG. 15 is a flow chart showing print processing in step S1411 in detail.

The printer driver receives graphic data (data of an image or document to be printed) transferred from the graphic engine in step S1501, and determines in step S1502 whether a new block need be generated. In this case, a new block is generated upon newly starting generation of print data or upon changing any of double-/single-side printing, paper type, paper size, color information, the number of pages per sheet, and the number of copies that are included in the detailed information 406 in FIG. 5.

In step S1503, a new block is generated. If the newly generated block is at the start of a new print job, the printer driver 203 ensures in the memory an area starting from the printer name to block information 405 in FIG. 5, and writes the information determined at this time in the area.

In step S1504, the printer driver ensures an area used for detailed information of the new block in the format of FIG. 5, and writes the currently determined information such as double-/single-side printing, paper type, paper size, color information, the number of pages per sheet, and the number of copies.

In step S1505, the printer driver generates, from the graphic data, e.g., a PDL command to be transmitted to the printer. The printer driver checks in step S1506 whether the command generated in step S1506 is a sheet discharge command, and if YES in step S1506, counts the number of sheets in the detailed information of the block in step S1507.

The printer driver determines in step S1508 whether to end the print job, and if YES in step S1508, transmits the print data via the OS, and ends the processing.

In this manner, the printer driver generates detailed job accounting information while generating print data.

<Authentication Processing by Printer Having Job Accounting Function>

Figure 16:
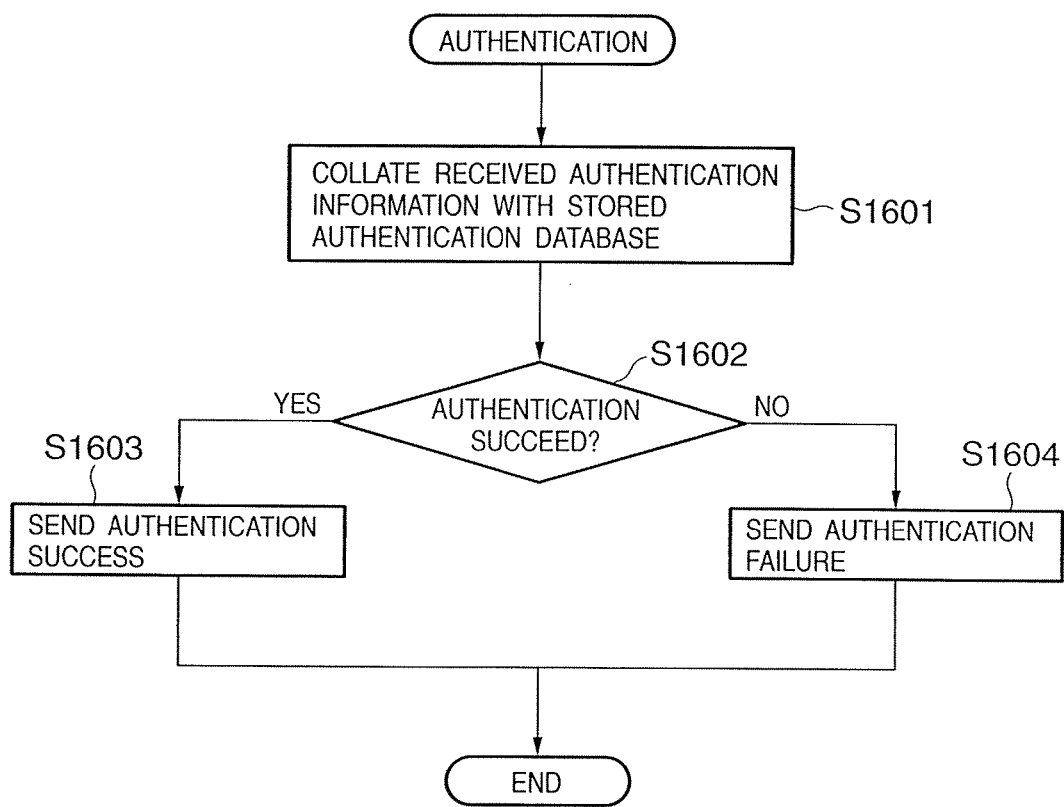
FIG. 16 is a flow chart showing authentication processing procedures by a server or a printer having a job accounting function in the first embodiment.

FIG. 16 shows authentication processing procedures by the printer 104 having the job accounting function. These procedures also apply to authentication processing by the job accounting server application 100.

If authentication information is transmitted from the printer driver 203 to the job accounting client application 205 in step S1408, it is sent from the job accounting client application 205 to the printer 104 having the job accounting function. Then, the flow in FIG. 16 starts. In step S1601, the printer 104 collates the received authentication information with a database of correct authentication information stored in advance. The printer 104 determines the result in step S1602. If collation succeeds, the printer 104 sends an authentication success message to the job accounting client application 205 in step S1603; if NO in step S1602, sends an authentication failure message to the job accounting client application in step S1604. The job accounting system of the first embodiment implements the following characteristic functions.

(1) User authentication can be done prior to printing to prevent a situation in which authentication information is found to be incorrect when user authentication is done in printing.

(2) The manager user can set whether to save authentication information. Hence, the manager can change this setting in accordance with the usage of the printer and the situation of the overall network system connected to the printer. For example, the manager can strictly manage a color printer whose print cost is relatively high by inputting authentication information every time a user uses the printer, and can simplify the operation of a monochrome printer which is used with a relatively low cost at the highest frequency by saving authentication information. Further, the manager can cause a user to input authentication information every printing in order to accurately grasp account information of each department for a printer shared by a plurality of departments having different account management units.

(3) When save of authentication information is set, the saved authentication information is used, the user need not input authentication information, and the print time can be shortened.

(4) Setting of inputting authentication information every print job can be selected. At a terminal shared by a plurality of users, authentication information is input every print job regardless of whether authentication information has been saved. At a terminal dedicated to a single user, if authentication information has been saved, printing is executed by using the saved authentication information. This can realize efficient processing for a terminal dedicated to a single user and accurate account management for a terminal shared by a plurality of users.

(5) Accurate account management can be achieved because the printer driver can generate job accounting information in accordance with not only the number of sheets but also double-/single-side printing, paper type, paper size, color information, and the number of pages per sheet.

That is, detailed counting processes coping with various print forms from applications can be performed by counting the number of sheets for each print setting. Further, accounting or the like can be accurately done based on detailed information.

Second Embodiment

Figure 18:
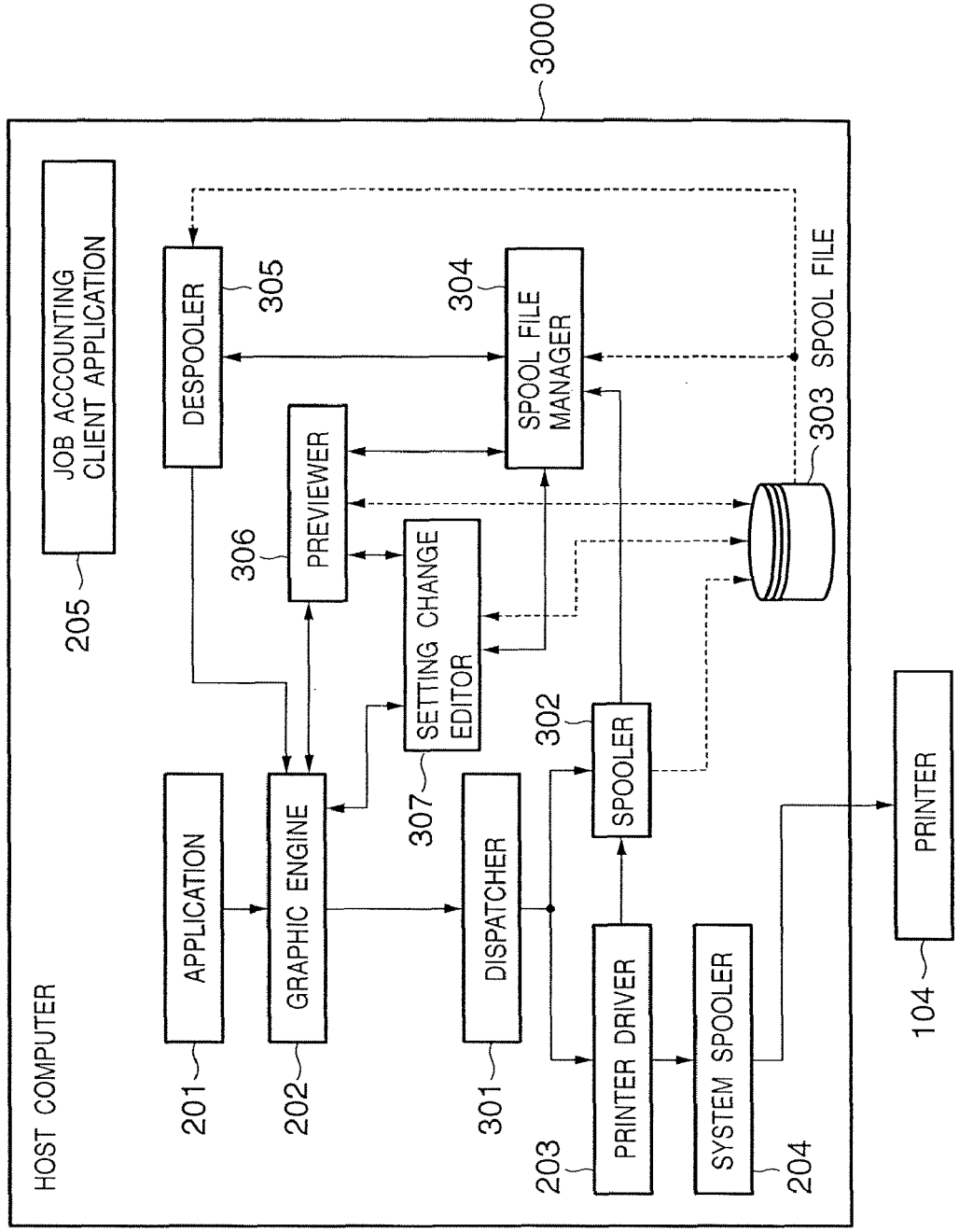
FIG. 18 is a block diagram showing the arrangement of a print system of spooling a print instruction from an application by an intermediate code.

In a print system according to the second embodiment, in addition to the print system comprised of the printer and host computer shown in FIG. 2, print data from an application may be temporarily spooled by intermediate code data, as shown in FIG. 18.

FIG. 18 shows an extended system of the system in FIG. 2. In transferring a print instruction from a graphic engine 202 to a printer driver 203, a spool file 303 made of an intermediate code is temporarily generated. In the system of FIG. 2, the application 201 is released from print processing when the printer driver 203 converts all print instructions from the graphic engine 202 into printer control commands. To the contrary, in the system of FIG. 18, an application 201 is released from print processing when an internal printer driver spooler (to be referred to as a spooler hereinafter) 302 converts all print instructions into intermediate code data and outputs the data to the spool file 303. In general, the processing time is shorter in the latter case. In the system shown in FIG. 18, the contents of the spool file 303 can be processed. This realizes various page handling functions such as a function of scaling print data from the application and a function of reducing a plurality of pages into one page and printing it. This also enables edit such as job combination and page rearrangement, and data preview, which will be described later. Moreover, resource-saving printing considering the printer function and improvement in performance can be achieved by analyzing data and determining color/monochrome printing.

For these purposes, the system of FIG. 2 is extended to spool print data by intermediate code data, as shown in FIG. 18. Note that processing of print data is generally set from a window provided by the printer driver 203.

Basic processing in the extended system of FIG. 18 will be explained. A dispatcher 301 receives a print instruction from the graphic engine 202. If the print instruction received by the dispatcher 301 from the graphic engine 202 is one issued from the application 201 to the graphic engine 202, the dispatcher 301 loads the spooler 302 stored in an external memory 11 and transmits the print instruction to not the printer driver 203 but the spooler 302.

The spooler 302 converts the received print instruction into an intermediate code and outputs the code to the spool file 303. The spooler 302 acquires, from the printer driver 203, processing settings concerning print data set for the printer driver 203, and saves them in the spool file 303.

The spool file 303 is generated as a file in the external memory 11, but may be generated in an internal memory. The spooler 302 loads a spool file manager 304 stored in the external memory and notifies the spool file manager 304 of the generation status of the spool file 303. The spool file manager 304 determines whether printing is possible in accordance with the contents of the processing settings concerning the print data stored in the spool file 303.

If the spool file manager 304 determines that printing is possible by using the graphic engine 202, the spool file manager 304 loads a despooler 305 stored in the external memory and instructs the despooler 305 to execute print processing of the intermediate code described in the spool file 303.

The despooler 305 processes the intermediate code included in the spool file 303, in accordance with the contents of the processing settings included in the spool file 303, and outputs the processed code via the graphic engine 202 again.

If the print instruction received by the dispatcher 301 from the graphic engine 202 is one issued from the despooler 305 to the graphic engine 202, the dispatcher 301 sends the print instruction to not the spooler 302 but the printer driver 203.

The printer driver 203 generates a printer control command and transmits it to the system spooler 204.

<Spool Processing of Print Job>

FIG. 18 shows an example in which preview, change of print settings, and combination of a plurality of jobs are enabled by arranging a previewer 306 and setting change editor 307 in addition to the above-described expanded system.

Figure 19:
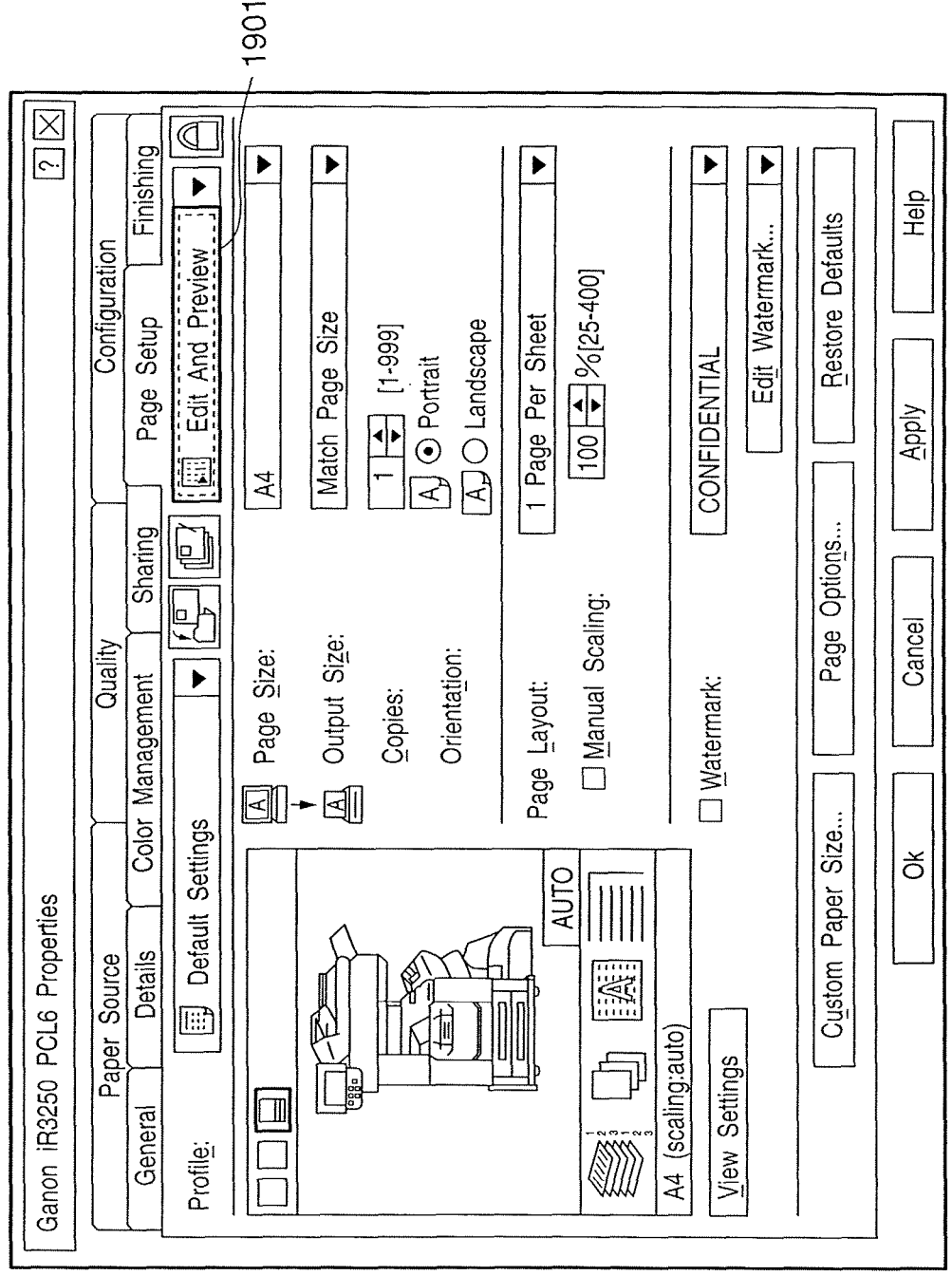
FIG. 19 is a view showing an example of a printer driver GUI in spool.

To perform print preview, change of print settings, and combination of a plurality of jobs, "Edit and Preview" is designated on a pull-down menu serving as a means for performing "Designate Output Destination" in the properties of the printer driver, as represented by a menu box 1901 of FIG. 19.

Figure 20:
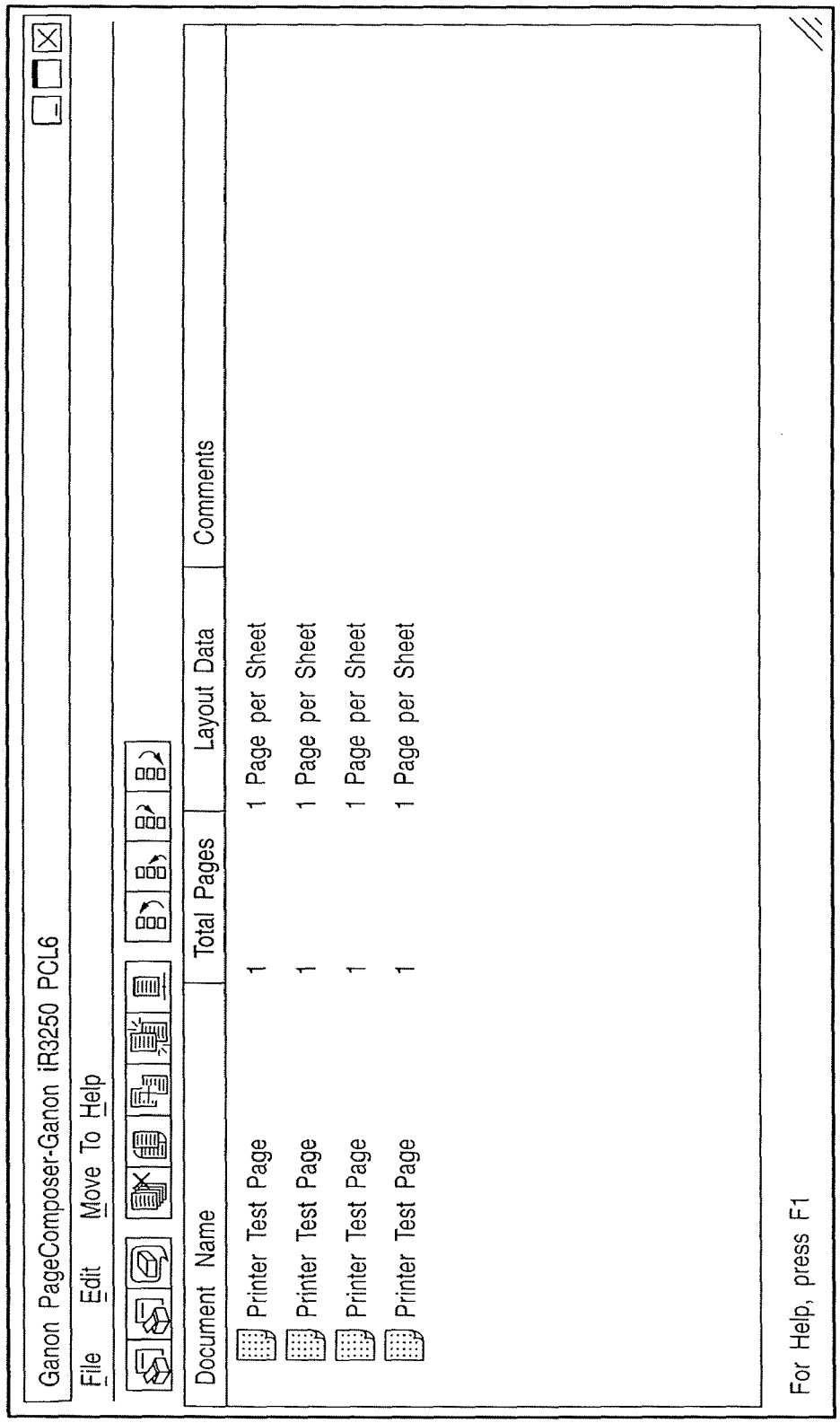
FIG. 20 is a view showing an example of a GUI displayed in preview after print settings are changed.

The contents set by the properties of the printer driver are stored in a structure provided by an OS as a setting file (called DEVMODE in Windows OS). In this structure, for example, processing settings included in the spool file 303 contain a setting representing whether to store data in the spool file manager 304. When the spool file manager 304 reads the processing setting via the printer driver and finds that "store" has been designated, a page drawing file and job setting file are generated and stored in the spool file 303, as described above. The window of the spool file manager is popped up, and a list of jobs spooled to the spool file 303 is displayed, as shown in FIG. 20. FIG. 20 shows an example in which four jobs are spooled. Jobs can be processed by clicking the menu bar or the menu icon immediately below the menu bar.

The menu bar and menu icon are the same in the numbers of operations. The types of operations are 11 operations: "Print" while a job is selected, "Proof Print" for performing printing while a spool file of an intermediate code is left, "Print Preview" for allowing the user to see an output preview of a job considering print settings, "Delete" for deleting a spool file of an intermediate code, "Duplicate" for forming a copy of a spool file of an intermediate code, "Combine" for combining jobs of spool files of intermediate codes into one job, "Separate" for separating a combined job into a plurality of original jobs, "Change Print Settings" for changing the print settings (layout setting, finishing setting, and the like) of a single or combined job, "Move to-Top" for changing the print order of a given job to the top, "Move to-Previous" for changing the print order of a given job to an immediately preceding job, "Move to-Next" for changing the print order of a given job to an immediately succeeding job, and "Move to-Last" for changing the print order of a given job to the last.

When preview of a single or combined job is designated on the window (FIG. 20) of the spool file manager, the previewer 306 is loaded and instructed to perform preview processing for a job of an intermediate code described in the spool file 303.

The previewer 306 sequentially reads out page drawing files (PDF) of intermediate codes included in the spool file 303, processes the files in accordance with the contents of processing setting information included in a job setting file (SDF) stored in the spool file 303, and outputs a GDI function to the graphic engine 202. The graphic engine 202 outputs drawing data to the client area, and then the data can be output on the screen.

The graphic engine 202 can execute appropriate rendering in accordance with a designated output destination. From this, similar to the despooler 305, the previewer 306 can be implemented by processing an intermediate code included in the spool file 303 in accordance with the contents of processing settings included in the spool file 303 and outputting the processed data by using the graphic engine 202. The processing settings set by the printer driver are stored as a job setting file in the spool file 303, and data of a page drawing file is processed and output on the basis of the job setting file. The user can be provided with how to print actual drawing data, and with a print preview close to a printer output in accordance with a case wherein N-up printing (processing of reducing and laying out N logic pages into one physical page and printing the physical page) is designated, a case wherein double-side printing is designated, a case wherein booklet printing is designated, and a case wherein a stamp is designated. Note that the preview function of conventional application software such as document preparation software draws print data on the basis of the page settings of the application, the print settings of the printer driver are not reflected, and the user cannot recognize a preview of an actual printout.

Figure 21:
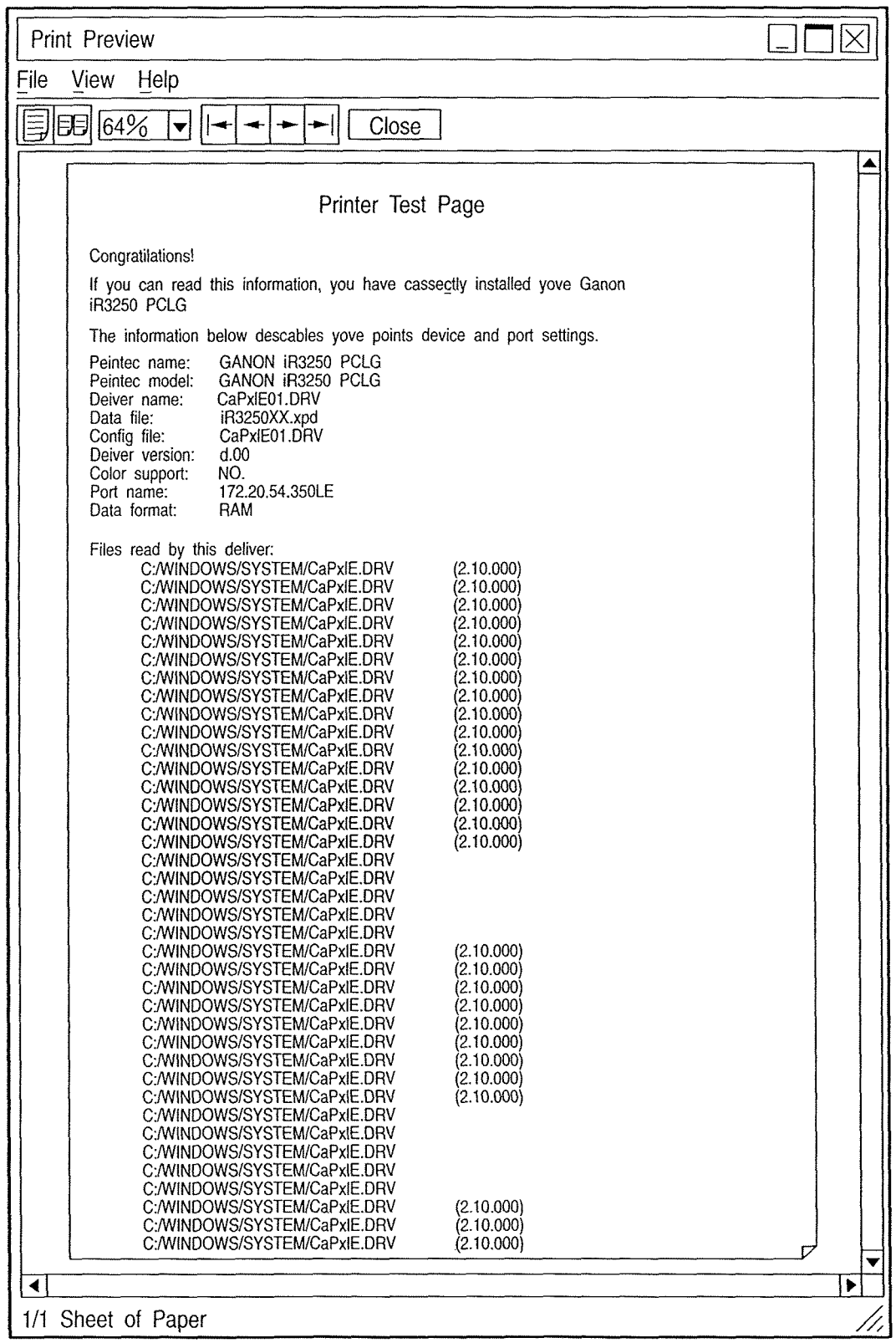
FIG. 21 is a view showing an example of a preview window.

By this preview processing, a large preview of print processing settings included in the spool file 303 are displayed on the screen by the previewer 306, as shown in FIG. 21. The previewer 306 is closed by a display stop instruction from the user, and the control shifts to the window (FIG. 20) of the spool file manager.

If the user performs printing in accordance with the contents displayed by the previewer 306, he/she issues a print request by designating "Print" or "Proof Print" on the spool file manager 304. In accordance with the print request, the despooler 305 processes a page drawing file on the basis of a job setting file to generate a GDI function, the GDI function is transmitted to the graphic engine 202, and a print instruction is sent to the printer driver 203 via the dispatcher 301 to execute printing, as described above.

In this manner, when spool is designated in "Edit and Preview" settings, generated print data is stored in the spooler in units of jobs. If a plurality of spooled print jobs are selected, and "Combine" is designated for the selected jobs, the spooler combines the selected print jobs into one job.

<Job Accounting Processing of Spooled Print Job>

Figure 22:
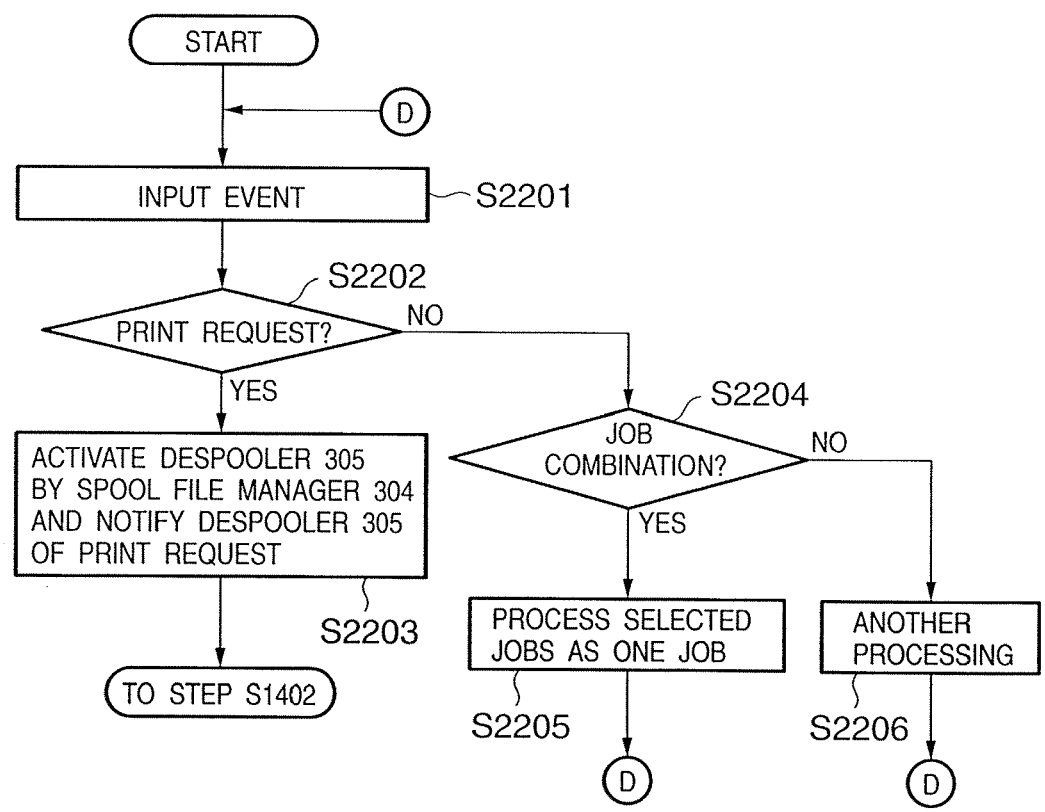
FIG. 22 is a flow chart showing print processing in the second embodiment.

Processing after print data is spooled when job accounting is done in the spool system will be described with reference to FIG. 22.

In step S2201, the spool file manager 304 receives an event input.

If the event is a print instruction in step S2202, the spool file manager 304 advances to step S2203; if NO, to step S2204.

In step S2203, the spool file manager 304 activates the despooler 305 and issues a print instruction. In this case, the despooler 305 functions as the application in FIG. 21. Authentication information is inquired in printing when a print request is issued to the printer driver 203 via the dispatcher 301 again. The subsequent processing is the same as in step S1402 and subsequent steps in FIG. 14.

If the event is a job combination request in step S2204, the spool file manager 304 advances to step S2205; if NO, to step S2206.

In step S2205, the spool file manager 304 processes a plurality of selected jobs as a combined job. More specifically, the single despooler 305 issues a print request (processing in step S2203) for the spool file 303 of these jobs at once.

Print data from the application is transferred to the spooler 204 via the dispatcher 301. At this time, no data is transmitted to the printer driver 203.

Even when a plurality of jobs are combined and printed, as shown in FIG. 20, authentication is requested for not each job before combination but one combined job.

Figure 23:
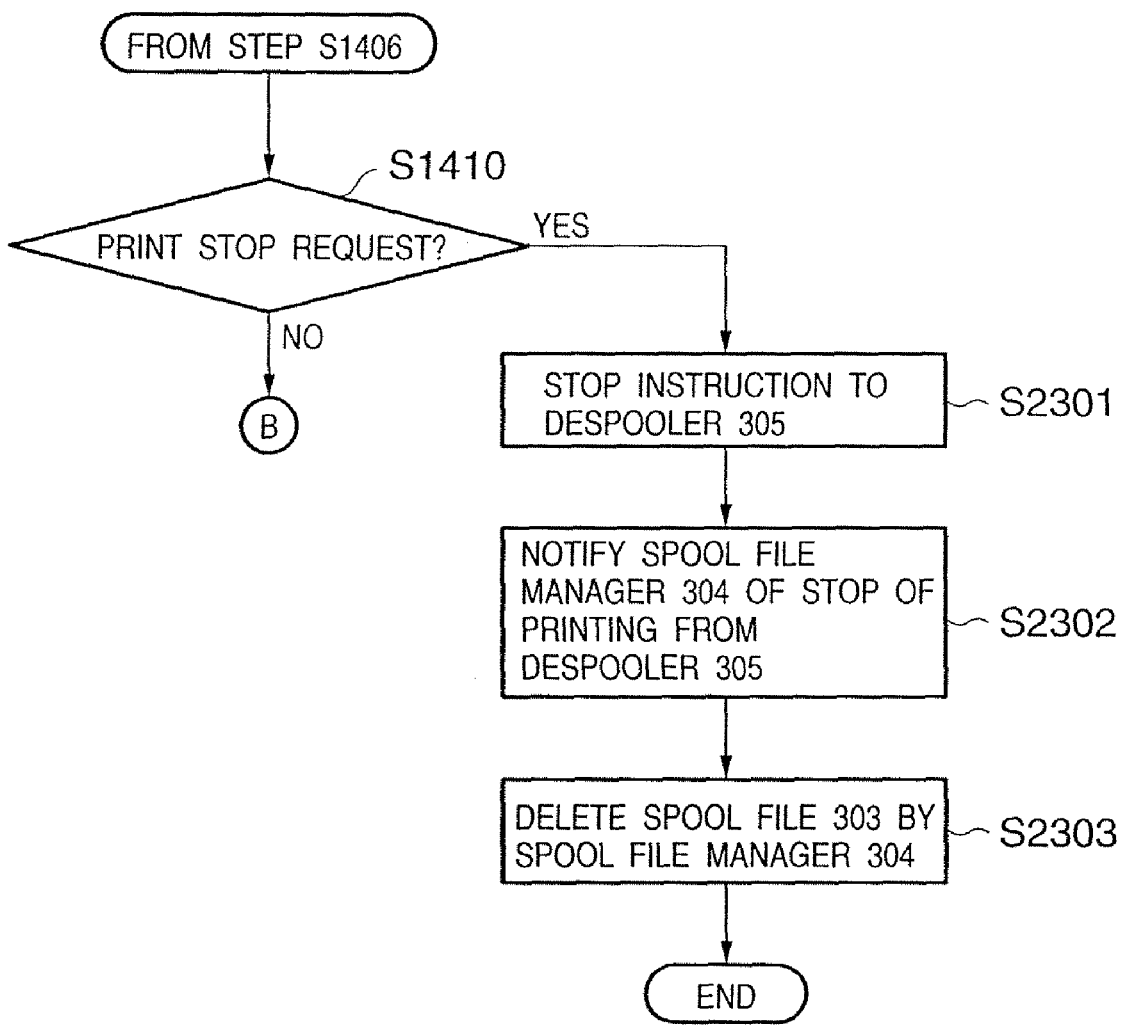
FIG. 23 is a flow chart showing print processing in the second embodiment.

The processing method of the spool system when the cancel button 1103 is clicked on the authentication information input window shown in FIG. 11, similar to the operation described in the first embodiment, will be explained with reference to FIG. 23. The processing procedures are almost the same as those in FIG. 14, and FIG. 23 shows only different procedures from those in FIG. 14.

More specifically, processing in step S1412 and subsequent steps in FIG. 14 are different. In step S2301, a print stop instruction in step S1410 is sent to not the application but the despooler 305.

In step S2302, the despooler 305 notifies the spool file manager 304 of the stop of printing, and is unloaded from the internal memory.

In step S2303, the spool file manager 304 deletes the spool file 303 generated by the spooler 302, and is unloaded from the internal memory. As a result, job accounting is performed without holding any spool file in the external memory even when the spool system is added to the job accounting system.

With these procedures, the job accounting system of the second embodiment implements the following characteristic function in addition to functions (1) to (5) implemented by the system of the first embodiment.

(6) As for a print job obtained by combining a plurality of print jobs by combination operation, authentication processing is performed once for the combined job as a single print job. This can realize simple user operation and fast printing.

The present invention may be applied to a system constituted by a plurality of devices (host computer, interface device, reader, printer, and the like) or an apparatus comprising a single device (copying machine, printer, facsimile apparatus, or the like).

The object of the present invention is also achieved when the computer (or the CPU or MPU) of a system or apparatus reads out and executes program codes stored in a storage medium which stores software program codes for realizing the functions of the above-described embodiments, i.e., the procedures in FIGS. 13 to 17 or FIGS. 22 and 23.

In this case, the program codes read out from the storage medium realize the functions of the above-described embodiments, and the storage medium which stores the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the computer executes the readout program codes, but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes.

As has been described above, the present invention can perform detailed counting processes coping with various print forms from applications, and can accurately perform accounting or the like based on detailed information.

As many apparently widely different embodiments of the present invention can be made without departing from the spirit and scope thereof, it is to be understood that the invention is not limited to the specific embodiments thereof except as defined in the appended claims.

What is claimed is:

1. A print control apparatus for outputting print data to a printer via a network, comprising:
   a holding unit, configured to hold authentication information to be used for authentication preliminarily, wherein said holding unit is realized as an authentication function of software for generating print data;
   an instruction unit, configured to make an instruction for enabling the authentication function;

an authentication request unit, configured to send the authentication information preliminarily held to the network to perform authentication, when the authentication function is enabled by the instruction unit; and an output unit, configured to output the print data to a printer when the authentication using the authentication information held preliminarily is succeeded.

2. The apparatus according to claim 1, further comprising an input unit, configured to input authentication information when printing is instructed, wherein said authentication request unit sends (i) the input authentication information to the network when the authentication information is input by said input unit, and (ii) the authentication information preliminarily held to the network when the authentication information is not input by said input unit.

3. The apparatus according to claim 1, wherein said authentication request unit sends the authentication information to the network.

4. The apparatus according to claim 1, wherein said input unit prompts a user to input the authentication information by displaying a window for inputting authentication information, and the input authentication information is displayed with a character string different from actually input authentication information.

5. The apparatus according to claim 1, wherein the output unit outputs the print data to the printer without the authentication using the authentication information, when the authentication function is not enabled by the instruction unit.

6. The apparatus according to claim 1, wherein the instruction made by the instruction unit is performed by using a check box on a user interface of the software for generating the print data.

7. The apparatus according to claim 1, wherein the software for generating the print data is a printer driver.

8. The apparatus according to claim 1, wherein the holding unit holds identification information for specifying a department or a user and a password as the authentication information.

9. The apparatus according to claim 1, wherein the authentication information is used for a job accounting.

10. A print control method for outputting print data to a printer via a network, the method comprising:

a holding step of holding authentication information to be used for authentication preliminarily, wherein said holding step is realized as an authentication function of software for generating print data;

an instruction step of making an instruction for enabling the authentication function;

an authentication request step of sending the authentication information preliminarily held to the network to perform authentication, when the authentication function is enabled in the instruction step; and an output step of outputting the print data to a printer when the authentication using the authentication information held preliminarily is succeeded.

11. The method according to claim 10, further comprising an input step of inputting authentication information when printing is instructed, wherein said authentication request step sends (i) the input authentication information to the network when the authentication information is input in said input step, and (ii) the authentication information preliminarily held to the network when the authentication information is not input in said input step.

12. The method according to claim 10, wherein said authentication request step sends the authentication information to the network.

13. The method according to claim 10, wherein said input step prompts a user to input the authentication information by displaying a window for inputting authentication information, and the input authentication information is displayed with a character string different from actually input authentication information.

14. The method according to claim 10, wherein the print data is output in the output step to the printer without the authentication using the authentication information, when the authentication function is not enabled in the instruction step.

15. The method according to claim 10, wherein the instruction made in the instruction step is performed by using a check box on a user interface of the software for generating the print data.

16. The method according to claim 10, wherein the software for generating the print data is a printer driver.

17. The method according to claim 10, wherein identification information for specifying a department or user and a password as the authentication information is held in the holding step.

18. The method according to claim 10, wherein the authentication information is used for a job accounting.

19. A non-transitory computer-readable storage medium which retrievably stores a computer-executable program which, when executed by a computer, performs a method for outputting print data to a printer via a network, the method comprising:

a holding step of holding authentication information to be used for authentication preliminarily, wherein said holding step is realized as an authentication function of software for generating print data;

an instruction step of making an instruction for enabling the authentication function;

an authentication request step of sending the authentication information preliminarily held to the network to perform authentication, when the authentication function is enabled in the instruction step; and an output step of outputting the print data to a printer when the authentication using the authentication information held preliminarily is succeeded.

20. The non-transitory computer-readable storage medium according to claim 19, wherein the method further comprises an input step of inputting authentication information when printing is instructed, wherein said authentication request step sends (i) the input authentication information to the network when the authentication information is input in said input step, and (ii) the authentication information preliminarily held to the network when the authentication information is not input in said input step.

21. The non-transitory computer-readable storage medium according to claim 19, wherein said authentication request step sends the authentication information to the network.

22. The non-transitory computer-readable storage medium according to claim 19, wherein said input step prompts a user to input the authentication information by displaying a window for inputting authentication information, and the input authentication information is displayed with a character string different from actually input authentication information.

23. The non-tansitory computer-readable storage medium according to claim 19, wherein the print data is output in the output step to the printer without the authentication using the authentication information, when the authentication function is not enabled in the instruction step.

24. The non-transitory computer-readable storage medium according to claim 19, wherein the instruction made in the instruction step is performed by using a check box on a user interface of the software for generating the print data.

25. The non-transitory computer-readable storage medium according to claim 19, wherein the software for generating the print data is a printer driver.

26. The non-transitory computer-readable storage medium according to claim 19, wherein identification information for specifying a department or user and a password as the authentication information is held in the holding step.

27. The non-transitory computer-readable storage medium according to claim 19, wherein the authentication information is used for a job accounting.

* * * * *